(12) United States Patent
Yu et al.

(10) Patent No.: US 12,533,373 B2
(45) Date of Patent: Jan. 27, 2026

(54) β-GLUCAN COMPOSITION AND USE THEREFOR

(71) Applicants: Qingdao Conson Pharmaceutical Co., Ltd., Shandong (CN); Marine Biomedical Research Institute of Qingdao Co., Ltd., Shandong (CN)

(72) Inventors: Guangli Yu, Shandong (CN); Youjing Lv, Shandong (CN); Xianjun Qu, Shandong (CN); Chenyang Zhao, Shandong (CN); Jiejie Hao, Shandong (CN); Quancai Li, Shandong (CN); Xia Zhao, Shandong (CN); Ting Hu, Shandong (CN); Huashi Guan, Shandong (CN)

(73) Assignees: QINGDAO CONSON PHARMACEUTICAL CO., LTD., Shandong (CN); MARINE BIOMEDICAL RESEARCH INSTITUTE OF QINGDAO CO., LTD., Qingdao (CN)

( * ) Notice: Subject to any disclaimer, the term of this patent is extended or adjusted under 35 U.S.C. 154(b) by 834 days.

(21) Appl. No.: 17/618,883

(22) PCT Filed: Jun. 15, 2020

(86) PCT No.: PCT/CN2020/096224
§ 371 (c)(1),
(2) Date: Dec. 14, 2021

(87) PCT Pub. No.: WO2020/249133
PCT Pub. Date: Dec. 17, 2020

(65) Prior Publication Data
US 2022/0265697 A1 Aug. 25, 2022

(30) Foreign Application Priority Data
Jun. 14, 2019 (CN) .......................... 201910526252.0

(51) Int. Cl.
*A61K 31/716* (2006.01)
*A23L 33/22* (2016.01)
*A61P 35/00* (2006.01)

(52) U.S. Cl.
CPC ............ *A61K 31/716* (2013.01); *A23L 33/22* (2016.08); *A61P 35/00* (2018.01)

(58) Field of Classification Search
CPC .... A61K 31/716; A61K 31/715; A61K 31/70; A23L 33/22; A23L 29/271; A61P 35/00; A23V 2250/5034
See application file for complete search history.

(56) References Cited

U.S. PATENT DOCUMENTS

| 10,111,900 B2 | 10/2018 | Bose et al. |
| 10,111,901 B2 | 10/2018 | Bose et al. |
| 10,912,794 B2 | 2/2021 | Horst et al. |
| 2009/0048208 A1 | 2/2009 | Byun et al. |
| 2010/0266626 A1 | 10/2010 | Berti et al. |
| 2019/0060350 A1 | 2/2019 | Bose et al. |
| 2019/0060351 A1 | 2/2019 | Bose et al. |
| 2021/0283169 A1 | 9/2021 | Bose et al. |
| 2022/0047620 A1 | 2/2022 | Bose et al. |
| 2024/0350528 A1 | 10/2024 | Bose et al. |

FOREIGN PATENT DOCUMENTS

| CN | 102277400 A | 12/2011 |
| CN | 102408495 A | 4/2012 |
| CN | 103059160 A | 4/2013 |
| CN | 103304680 A | 9/2013 |
| CN | 105001352 A | 10/2015 |
| CN | 106687122 A | 5/2017 |
| CN | 108430479 A | 8/2018 |
| CN | 109793752 A | 5/2019 |
| CN | 110917207 A | 3/2020 |
| JP | H10194976 A | 7/1998 |
| JP | H10194977 A | 7/1998 |
| JP | 2006296349 A | 11/2006 |

(Continued)

OTHER PUBLICATIONS

Fu, Y.; et al. "B-1,3-Glucan with different degree of polymerization induced different defense responses in tobacco" 2011, Carbohydrate Polymers, vol. 86, pp. 774-782. (Year: 2011).*
Menard, M.; et al. "Role of Protein Contaminants in the Immunogenicity of Alginates" 2010, Journal of Biomedical Material Research, pp. 333-340. (Year: 2010).*
English language machine translation of WO 2017008768 A1; translated Dec. 3, 2024. (Year: 2017).*
Cummins, P. M .; et al. Methods in Molecular Biology 2016, vol. 1485, chapter 11, "Ion-Exchange Chromatography: Basic Principles and Application", pp. 209-224. (Year: 2016).*

(Continued)

*Primary Examiner* — Eric Olson
*Assistant Examiner* — Benjamin M Brandsen
(74) *Attorney, Agent, or Firm* — Panitch Schwarze Belisario & Nadel LLP

(57) ABSTRACT

A β-glucan composition and use thereof. Specifically provided are uses of the β-glucan composition in preparing a composition for improving or treating immune-related diseases, said β-glucan being a β-glucan containing β-1,3 and β-1,6 glucosidic bonds in the molecules thereof, and having a molecular weight of 1-50 kDa. The β-glucan features a novel structure, a controllable mass, abundant sources, simple preparation processing, high product purity, strong biological activity, and is easy to produce industrially, among other strengths. The resulting water soluble β-glucan composition features better antitumor activity, has the potential to be developed into a safe and effective novel drug for improving or treating immune-related diseases and fighting tumors.

18 Claims, 22 Drawing Sheets

(56) References Cited

FOREIGN PATENT DOCUMENTS

| JP | 2009035732 A | 2/2009 |
| JP | 2011504487 A | 2/2011 |
| WO | 2017008768 A1 | 1/2017 |

OTHER PUBLICATIONS

Hao et al., "Progress in the immunomodulatory effect of β-glucan," Chinese Journal of Cellular and Molecular Immunology, vol. 30, No. 1, pp. 97-100 (2014), with English machine translation.

Jia et al., "Progress on the antitumor effect of β-glucan (β-glucan)," Chinese and Foreign Medical Treatment, vol. 20, pp. 187-189 (2010), with English machine translation.

Yang et al., "A β-glucan from Durvillaea Antarctica has immunomodulatory effects on RAW264.7 macrophages via toll-like receptor 4," Carbohydrate Polymers, vol. 191, pp. 255-265 (2018).

Yufeng et al., "Immunomodulatory effects and biological significance of β-glucan on dendritic cells," Chinese Journal of Food Hygiene, vol. 27, No. 5, pp. 599-603 (2015), with English machine translation.

Bobadilla et al., "Soluble Beta-1,3/1,6-glucan in seaweed from the south hemisphere and its immunomodulatory effect," Carbohydrate Polymers, vol. 92, pp. 241-248 (2013).

Jin et al., "Research Progress on Beta-Glucan and Its Development Potential in Health Industry, Food and Drug," vol. 20, No. 5, pp. 377-381 (2018) (with English Abstract).

\* cited by examiner

β-GLUCAN COMPOSITION AND USE THEREFOR

CROSS-REFERENCE TO RELATED APPLICATIONS

This application is a Section 371 of International Application No. PCT/CN2020/096224, filed Jun. 15, 2020, which was published in the Chinese language on Dec. 17, 2020 under International Publication No. WO 2020/249133 A1, which claims priority under 35 U.S.C. § 119 (b) to Chinese Application No. 201910526252.0, filed on Jun. 14, 2019, the disclosures of which are incorporated herein by reference in their entireties.

TECHNICAL FIELD

The present invention relates to the field of medicine, in particular to a β-glucan composition and use thereof.

BACKGROUND

Studies showed that β-1,3-glucans from different sources have different biological activities, including anti-tumor, immune regulation, anti-aging and anti-inflammatory properties. At present, most of the β-1,3-glucan in the market derived from barley, oats, edible fungi (Shiitake, *Grifola frondosa*, Schizophyllum), yeast and other terrestrial organisms. The molecular weight, linkage and degree of branch of the obtained β-1,3-glucan vary greatly due to different sources of raw materials, and it is difficult to control the quality, for example, the β-glucan for injection medicine mainly comes from shiitake, a kind of β-1,3-glucan with β-1,6-branches (LNT), having poor soluble in water, difficulty in separation mouse and purification and relative high impurity content due to its molecular weight of up to 400-800 kDa. With the continuous expansion of β-glucan application fields and the growing market demand, the existing β-glucan from shiitake can no longer meet the market needs.

Therefore, there is an urgent need in this field to develop a β-glucan with controlled quality, abundant sources, simple preparation process, high product purity, strong biological activity and simple industrial production.

SUMMARY OF INVENTION

The purpose of the present invention is to identify the specific structure of a kind of β-1,3/1,6-glucan and the uses of the composition thereof in the preparation of a composition for the treatment of immune-related diseases.

In the first aspect of the present invention, provided is a composition of β-1,3/1,6-glucan, the composition comprising β-glucan having a structure of formula (I) and/or formula (II),

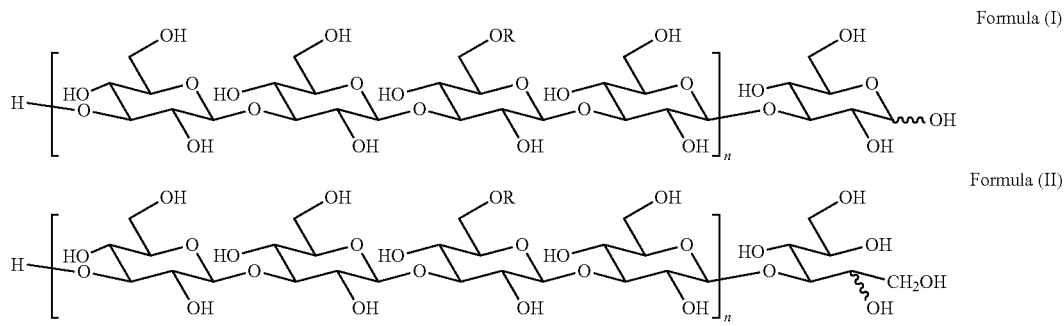

Formula (I)

Formula (II)

wherein n is an integer selected from 1-20 (e.g., 1, 2, 3, 4, 5, 6, 7, 8, 9, 10, 11, 12, 13, 14, 15, 16, 17, 18, 19 or 20), and R is H and/or no more than 4 glucose residues (e.g., 1, 2, 3 or 4 glucose residues).

Preferably, R in the structure of formula (I) or formula (II) is one or more of the structures of formula (III) or formula (IV) or formula (V) or formula (VI), wherein Glcβ1-;  Formula (III):

Glcβ1-3Glcβ1- or Glcβ1-6Glcβ1-;  Formula (IV):

Glcβ1-3Glcβ1-3Glcβ1-, or Glcβ1-6Glcβ1-3Glcβ1- or

Glcβ1-3Glcβ1-6Glcβ1-, or Glcβ1-6Glcβ1-6Glcβ1-;  Formula (V):

Glcβ1-3Glcβ1-3Glcβ1-3Glcβ1-, or

Glcβ1-6Glcβ1-3Glcβ1-3Glcβ1-, or

Glcβ1-3Glcβ1-6Glcβ1-3Glcβ1-, or

Glcβ1-3Glcβ1-3Glcβ1-6Glcβ1-, or

Glcβ1-6Glcβ1-6Glcβ1-3Glcβ1-, or

Glcβ1-6Glcβ1-3Glcβ1-6Glcβ1-, or

Glcβ1-3Glcβ1-6Glcβ1-6Glcβ1-, or

Glcβ1-6Glcβ1-6Glcβ1-6Glcβ-.  Formula (VI):

Preferably, in the composition of β-glucan, the weight content of five glucose to ten glucose is 0-50.0%, ten glucose to twenty glucose is 0-80.0%, twenty glucose to twenty-five glucose is 0-25.0%, twenty-five glucose to thirty glucose is 0-45.0%, thirty glucose to forty glucose is 0-30.0%, forty glucose to fifty glucose is 0-15.0%, fifty glucose to sixty glucose is 0.1%-55.0%, sixty glucose to seventy glucose is 0.1%-20.0%, seventy glucose to eighty glucoses is 0.1%-15.0%, and greater than eighty glucose is 0-40.0%.

Preferably, in the composition of β-glucan, the weight content of five glucose to ten glucose is 0-45.0%, ten glucose to twenty glucose is 0-75.0%, twenty glucose to twenty-five glucose is 0-20.0%, twenty-five glucose to thirty glucose is 0-40.0%, the weight content of β-glucan with a degree of polymerization of 30-40 is 0-25.0%, the weight content of forty glucose to fifty glucose is 0-10.0%, fifty glucose to sixty glucose is 0.1%-50.0%, sixty glucose to seventy glucose is 0.1%-15.0%, seventy glucose to eighty glucose is 0.1%-10.0%, and greater than eighty glucose is 0-35.0%.

Preferably, the composition of β-glucan consists of β-glucans with a degree of polymerization of 20-80, wherein the weight content of twenty glucose to twenty-five glucose is 13.2%-19.8%, twenty-five glucose to thirty glucose is 29.1-43.7%, thirty glucose to forty glucose is 18.2-27.4%, forty glucose to fifty glucose is 7.3-10.9%, fifty glucose to sixty glucose is 4.5%-6.7%, sixty glucose to seventy glucose is 3.5%-5.3%, and seventy glucose to eighty glucose is 4.2%-6.2%.

Preferably, the composition of β-glucan consists of β-glucans with a degree of polymerization of 20-80, wherein the weight content of twenty glucose to twenty-five glucose is 16.5%, twenty-five glucose to thirty glucose is 36.4%, thirty glucose to forty glucose is 22.8%, forty glucose to fifty glucose is 9.1%, fifty glucose to sixty glucose is 5.6%, sixty glucose to seventy glucose is 4.4%, and seventy glucose to eighty glucose is 5.2%.

Preferably, the composition of β-glucan consists of β-glucans with a degree of polymerization of 10-80, wherein the weight content of ten glucose to twenty glucose is 40.6%-60.8%, twenty glucose to twenty-five glucose is 13.4%-20.0%, twenty-five glucose to thirty glucose is 7.7%-11.5%, thirty glucose to forty glucose is 7.6%-11.4%, forty glucose to fifty glucose is 4.2%-6.2%, fifty glucose to sixty glucose is 2.3%-3.5%, sixty glucose to seventy glucose is 1.6%-2.4%, and seventy glucose to eighty glucose is 0.8%-1.2%.

Preferably, the composition of β-glucan consists of β-glucans with a degree of polymerization of 10-80, wherein the weight content of ten glucose to twenty glucose is 50.7%, twenty glucose to twenty-five glucose is 16.7%, twenty-five glucose to thirty glucose is 9.6 wt %, thirty glucose to forty glucose is 9.5%, forty glucose to fifty glucose is 5.2%, fifty glucose to sixty glucose is 2.9%, sixty glucose to seventy glucose is 2.0%, and seventy glucose to eighty glucose is 1.0%.

Preferably, the molecular weight of the β-1,3/1,6-glucan is 1-50 kDa; preferably, 2-30 kDa; more preferably, 2-10 kDa.

Preferably, the specific rotation of the β-1,3/1,6-glucan is no less than −15.0°; preferably, −15° to −25°; more preferably, −16° to 21°.

Preferably, in the β-1,3/1,6-glucan, the content of sulfate ions is 0.01 wt % to 2 wt %; preferably, 0.01 wt % to 0.5 wt %.

Preferably, in the β-1,3/1,6-glucan, the content of chloride ions is 0.01 wt % to 2 wt %; preferably, 0.01 wt % to 0.5 wt %.

Preferably, in the β-1,3/1,6-glucan, the content of proteins is 0.01 wt % to 5 wt %; preferably, 0.01 wt % to 0.5 wt %.

Preferably, the UV full-wavelength scanning spectrum of the β-1,3/1,6-glucan has no obvious absorption within the wavelength range of 300 to 900 nm; more preferably, no obvious absorption within the wavelength range of 230 to 900 nm.

Preferably, the UV full wavelength scan spectrum of the β-1,3/1,6-glucan has no absorption peak within the wavelength range of 260~280 nm.

Preferably, in side chains of the β-1,3/1,6-glucan, at least 20% of the side chains have a length of 1 or 2 glucose residues.

Preferably, in the β-glucan having the structure of formula (I) or formula (II), at least 3 to 20 of R are each independently 1 or 2 glucose residues.

Preferably, in the β-glucan having the structure of formula (I) or formula (II), at least 3 to 10 of R each independently have the structure of formula (III) or formula (IV); wherein the structures of formula (III) and formula (IV) are as defined above.

Preferably, in the side chains of the β-1,3/1,6-glucan (when R≠H), at least 5% of the side chains (R) have a length of 3 or 4 glucose residues (preferably 5 to 15%, more preferably 5 to 10% of the side chains have a length of 3 or 4 glucose residues) and the rest side chains (R) have a length of 1 or 2 glucose residues.

Preferably, when the side chain (R) has a length of 1 or 2 glucose residues, the side chains (R) each independently have a structure of formula (III) or formula (IV), wherein the structures of formula (III) and formula (IV) are as defined above.

Preferably, when the side chain (R) has a length of 3 or 4 glucose residues, the side chain (R) each independently has a structure of formula (V) or formula (VI), wherein the structure of formula (V) or formula (VI) is as defined above.

In the second aspect of the present invention, provided is a use of the β-glucan as described in the first aspect or the composition of β-1,3/1,6-glucan according to the first aspect in the preparation of compositions for improving or treating immune-related diseases.

Preferably, the immune-related diseases are tumor or inflammatory diseases.

Preferably, the tumors are selected from the group consisting of colorectal cancer, lung cancer, and fibrosarcoma.

In the third aspect of the present invention, provided is a composition for improving or treating immune-related disease, the composition comprising.
  (1) the β-glucan as described in the first aspect or the composition of β-1,3/1,6-glucan according to the first aspect, and
  (2) pharmaceutically acceptable carriers.

In the fourth aspect of the present invention, provided is a preparing method of the β-1,3/1,6-glucan as described in the first aspect or the composition of β-1,3/1,6-glucans according to the first aspect, comprising the steps of:
  (1) degreasing: drying and smashing Antarctic brown algae, then soaking in organic solvent and stirring to obtain a degreased algal powder;
  (2) aqueous extraction: extracting the degreased algae powder by stirring with water at room temperature to obtain an aqueous extract;
  (3) grading: centrifuging the aqueous extract obtained from step (2), adding aqueous solution of a 1~3 mol/L calcium chloride to the supernatant obtained by centrifugation; stirring and then centrifuging, taking the supernatant for dialysis or ultra-filtration desaltion, concentrating under reduced pressure and drying to obtain crude polysaccharide;
  (4) purification: dissolving the crude polysaccharide from step (3) in distilled water, separating and purifying through anion exchange resin with distilled water and aqueous sodium chloride solution as the mobile phase, collecting the aqueous elution fraction, concentrating under reduced pressure and lyophilizing to obtain the β-1,3/1,6-glucan.

In another preferred embodiment, the separating and purifying through anion resin is separating and purifying through strong anion resin.

In another preferred embodiment, the separating and purifying through anion resin is: firstly, separating and purifying through strong anion resin, and then separating and purifying through weak anion resin; or separating and purifying through weak anion resin, and then separating and purifying through strong anion resin. Unexpectedly, the combination of weak anion resins and strong anion resins allows more efficient removal of impurities and to obtain β-1,3/1,6-glucans with longer side chains glucose residues, higher purity and triple helix structure.

Preferably, the strong anion resin is an anion resin containing quaternary ammonium groups.

Preferably, the weak anion resin is an anion resin containing diethylaminoethyl. Preferably, the Antarctic brown algae is Cochayuyo, sea bamboo shoot and/or Lessonia trabeculata, or *Durvillaea Antarctica*.

In the fifth aspect of the present invention, provided is a use of the composition of β-1,3/1,6-glucans according to the first aspect in combination with an immune checkpoint drug and/or a chemotherapeutic agent.

Preferably, the immune checkpoint drug is selected from programmed death 1 protein (PD-1) antagonist, PD-L1 antagonist, cytotoxic T lymphocyte antigen (CTLA-4) antagonist, lymphocyte activation gene-3 (LAG-3) antagonist, T cell immunoglobulin-3 (TIM-3) antagonist, T-cell immunoglobulin, ITIM structural domain protein (TIGIT) antagonist, and the combination thereof.

Preferably, the immune checkpoint drug is selected from anti-PD-1 antibody, and anti-PD-L1 antibody.

Preferably, the anti-PD-1 antibody or PD-L1 antibody is selected from Durvalumab, Atezolizumab, Nivolumab, BMS202, Spartalizumab, Camrelizumab, and the combinations thereof.

Preferably, the chemotherapeutic agent is selected from cytotoxic chemotherapeutic agents.

Preferably, the chemotherapeutic agent is selected from one of anthracyclines, 5-Fus, and alkaloids.

Preferably, the chemotherapeutic agent is selected from one or more of cisplatin, carboplatin.

Preferably, the combination of the drug or formulation with the immune checkpoint drug and/or chemotherapeutic agent is administered simultaneously, sequentially or separately.

In a sixth aspect of the invention, provided is a pharmaceutical composition, comprising:
(i) first active ingredient: the first active ingredient is the composition of β-1,3/1,6-glucan according to the first aspect:
(ii) second active ingredient; the second active ingredient comprises immune checkpoint drug and/or chemotherapeutic agent.

Preferably, the first active ingredient and the second active ingredient are formed in a single dosage form or in a separate dosage forms.

Preferably, the immune checkpoint drug is as described above.

Preferably, the chemotherapeutic agent is as described above.

In a seventh aspect of the present invention, provided is a use of the composition of 1,3/1,6-glucans according to the first aspect in the preparation of a drug or formulation for the treatment of leukocytopenia and/or thrombocytopenia.

Preferably, the leukocytes are lymphocytes.

Preferably, the lymphocytes are B cells and/or T cells.

Preferably, the drug or formulation can further be used in combination with immune checkpoint drugs.

Preferably, the combination use of the drug or formulation and the immune checkpoint drugs is administered simultaneously, sequentially or separately.

Preferably, the drug or formulation can further be used in combination with at least one chemotherapeutic agent.

Preferably, the combination use of the drug or formulation and the chemotherapeutic agent is administered simultaneously, sequentially or separately.

Preferably, the drug or formulation is used to treat cancer in an subject.

Preferably, the cancer is selected from one or more of melanoma, colorectal cancer, lung cancer, kidney cancer, liver cancer and breast cancer.

Preferably, the drug or formulation further comprises pharmaceutically acceptable carriers or excipients.

It should be understood that within the scope of the present invention, the above-described technical features of the present invention and the technical features described in detail below (e.g., embodiments) may be combined with each other to constitute a new or preferred technical solution. Limited by space, it will not be repeated here.

DETAILED DESCRIPTION OF THE INVENTION

Figure 1:
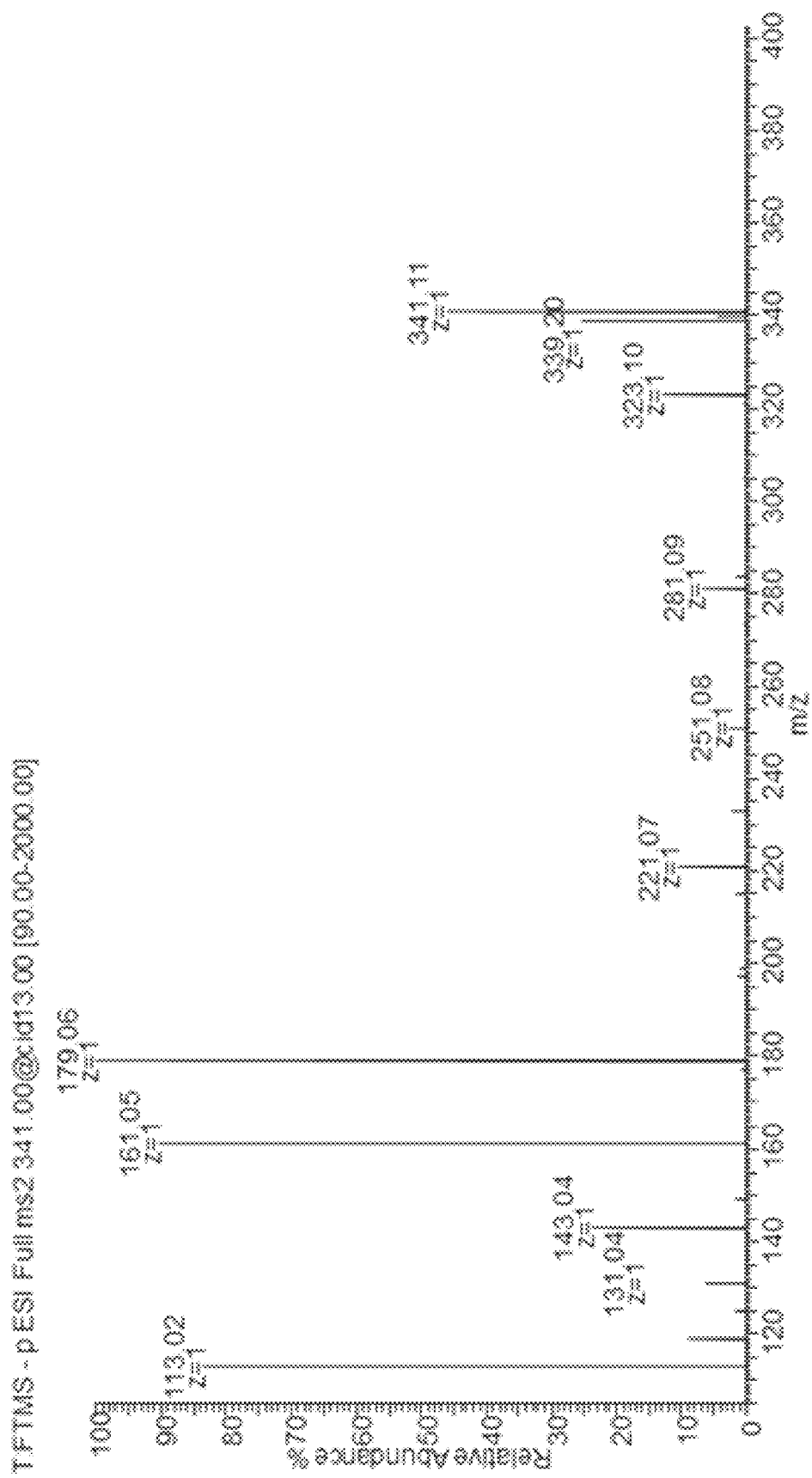
FIG. 1 shows the ESI-CID-MS/MS plot when the side chain is Glcβ1-6Glcβ3 of formula (IV).

The technical solution of the present invention is further elaborated below in conjunction with drawings and specific embodiments, other advantages and features of the present invention will become clearer after reading the specific embodiments of the present invention in conjunction with the drawings, but the scope of protection claimed by the present invention is not limited to the scope expressed in the embodiments. Those skilled in the art may make some modifications and adjustments to the present invention in accordance with the substance of the disclosure below, and these adjustments also fall within the scope of the present invention.

Terms

Unless otherwise defined, the following terms used in the specification and claims have the meanings commonly understood by those skilled in the art. Unless otherwise stated, all patents, applications, and published materials cited throughout this document are incorporated herein by reference in their entirety.

1) Degree of Polymerization: dp; referring to the number of repeating structural units in polymer macromolecules, in saccharides compounds, the degree of polymerization generally refers to the number of monosaccharide residues in the compound.
2) Polysaccharide: referring to a saccharide chain bound by glycosidic bonds, a polymeric carbohydrate formed by the condensation and dehydration of multiple monosaccharide residues.
3) Glucose: Glc; $C_6H_{12}O_6$, one of the most widely distributed and important monosaccharides in nature.
4) Oligosaccharide: also known as oligose, is a compound of saccharides formed by 2-20 identical or different monosaccharide residues linked by glycosidic bonds.
5) Saccharide residues: the groups obtained from the hydrolysis of saccharides.
6) Gluco-oligosaccharide: an oligosaccharide composed of glucose residues linked by glycosidic bonds.
7) Glucan: polysaccharide composed of glucose residues linked by glycosidic bonds.
8) ESI: Electrospray ionization, a common ionization modein mass spectrometry.
9) CID: Collision Induced Dissociation, a process of transferring energy to ions through collisions with neutral molecules, wherein the energy transfer is sufficient to cause bond cleavage and rearrangement.
10) MS: Mass spectrometry, an analytical method for measuring the charge-to-mass ratio (charge-mass ratio) of ions.

In the present invention, the terms "β-1,3/1,6-glucan" and "β-glucan" are used interchangeably and have the same meaning.

In the present invention, "β-1,3/1,6-glucan" includes structures of Formula I, Formula II, or derivatives thereof, or any combination thereof. For example, in the composition of β-1,3/1,6-glucan of the present invention, Formula I may occupy 0-100%, and the rest is Formula II; or the Formula II may occupy 0-100% and the rest is Formula I. In the present invention, the structure of Formula II may be considered as a ring-opening structure of Formula I. In addition, Formula I and Formula II may be inter-converted via suitable conditions or reagents.

In another preferred example, the β-1,3/1,6-glucan contains no or substantially no absorption peak of 260-280 nm.

In another preferred embodiment, the optical rotation of the β-1,3/1,6-glucan is greater than −15°; preferably, between −15° and −25°; more preferably, between −16° and −21°.

In the present invention, the terms "strong anion resin" and "strong anion exchange resin" can be used interchangeably, referring to anion resins containing strong reactive groups such as quaternary amine groups. In general, strong anion resins can be used for removing impurities containing groups such as sulfonic acid groups or carboxyl groups.

In the present invention, the terms "weak anion resin" and "weak anion exchange resin" can be used interchangeably, referring to anion resins containing weaker reactive groups such as diethylaminoethyl. In general, weak anion resins can be used for removing impurities such as nucleic acids, proteins, or pigments.

The main advantages of the invention include:

The compositions of β-glucan of the present invention are mixtures of β-glucans with different degrees of polymerization, different branches and side chains, the side chains thereof consist of β-1,3- and β-1,6-glucans and the length of the side chains are no more than four glucose residues, having novel structures and controllable quality. The compositions of β-glucan obtained by the present invention have better antitumor activity and are expected to be developed as a safe and effective new class of drugs for improving or treatment of immune-related diseases and antitumor drugs.

In particular, the inventors further improved the preparation method of β-1,3/1,6-glucan, purifying though a combination of strong anion chromatography and weak anion chromatography to obtain a β-1,3/1,6-glucan, which only has absorption peaks at the end of the UV full wavelength scan spectrum and no obvious absorption peak in the range of 230-900 nm (especially in the region of 260-280 nm), and has a further increased optical rotation (e.g., optical rotation at a range of −15°~−21°).

The present invention will be further explained below in conjunction with specific embodiments. It should be understood that these embodiments are only used to illustrate the present invention and not to limit the scope of the present invention. In the following examples, the test methods without specific conditions are usually in accordance with conventional conditions or the conditions recommended by the manufacturer. Unless otherwise specified, percentages and parts are percentages by weight and parts by weight.

Example 1. Preparation of β-1,3/1,6-Glucan

Preparation Example 1

(1) degreasing: drying and smashing Antarctic brown algae, then soaking in organic solvent and stirring to obtain a degreased algal powder;
(2) aqueous extraction: extracting the degreased algae powder by stirring with distilled water at room temperature to obtain an aqueous extract;
(3) grading: centrifuging the aqueous extract obtained from step (2), adding aqueous solution of 1-3 mol/L calcium chloride to the supernatant obtained by centrifugation; centrifuging after stirring, taking the supernatant for dialysis with distilled water or ultra-filtration desalination, concentrating under reduced pressure and drying to obtain crude polysaccharide;
(4) purification: dissolving the crude polysaccharide from step (3) in distilled water, separating and purifying through strong anion exchange resin with distilled water and aqueous sodium chloride solution as the mobile phase, collecting the aqueous elution fraction, concentrating under reduced pressure and lyophilizing to obtain the β-1,3/1,6-glucan.

Unless otherwise specified, the β-1,3/1,6-glucans used or verified in Examples 2-19 were prepared by the method of this Preparation Example.

Preparation Example 2

(1) degreasing: drying and smashing Antarctic brown algae, then soaking in organic solvent and stirring to obtain a degreased algal powder;
(2) aqueous extraction: extracting the degreased algae powder by stirring with distilled water at room temperature to obtain an aqueous extract;
(3) grading: centrifuging the aqueous extract obtained from step (2), adding aqueous solution of 1-3 mol/L calcium chloride to the supernatant obtained by centrifugation; stirring and then centrifuging, taking the supernatant for dialysis with distilled water or ultra-filtration desalination, concentrating under reduced pressure and drying to obtain crude polysaccharide;
(4) purification: dissolving the crude polysaccharide from step (3) in distilled water, separating and purifying through strong anion exchange resin with distilled water and aqueous sodium chloride solution as the mobile phase, collecting the aqueous elution fraction, concentrating under reduced pressure;
(5) second purification: separating and purifying the aqueous elution fraction from step (4) through a weak anion exchange resin with distilled water as the mobile phase, collecting the aqueous elution fraction;
(6) decolorization: separating and purifying the aqueous elution fraction from step (5) through an activated carbon column with distilled water as the mobile phase, collecting the aqueous elution fraction. concentrating under reduced pressure, and lyophilizing to obtain the β-1,3/1,6-glucan.

Unless otherwise specified, the β-glucans used or verified in Examples 20-25 were prepared by the method of this Preparation Example.

Examples 2-7 Analysis of β-Glucan Composition

Figure 5:
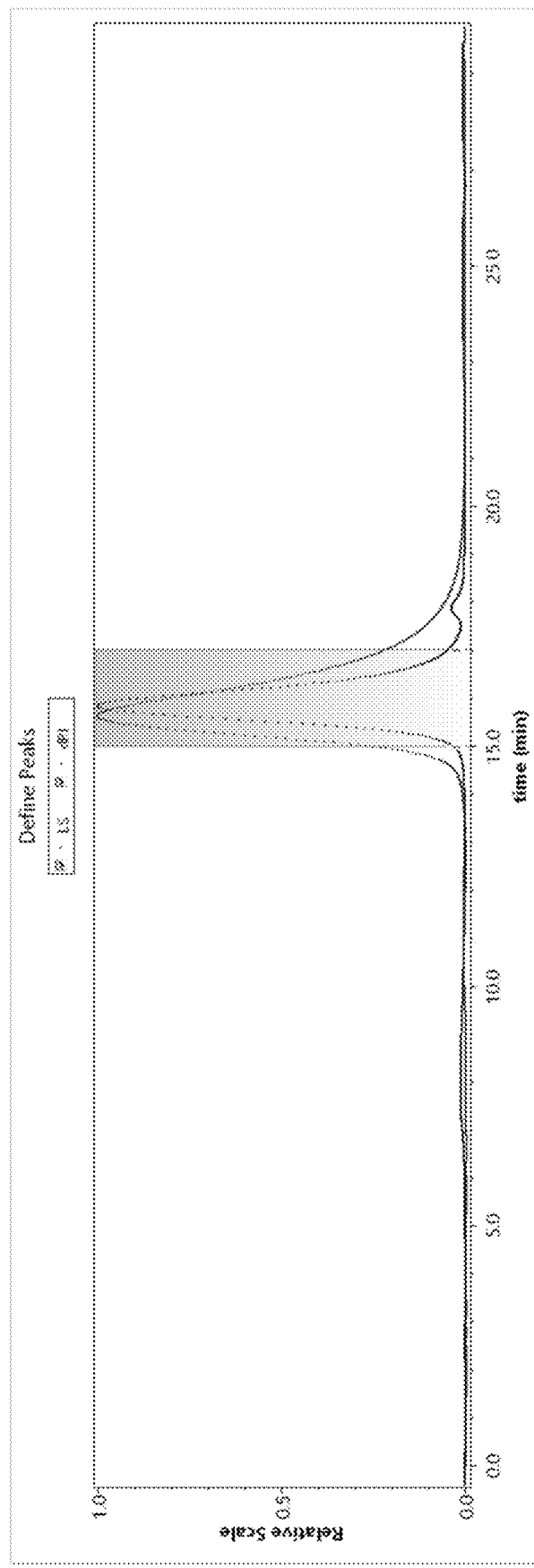
FIG. 5 shows the detection of mass average molar mass of Example 2.
Figure 6:
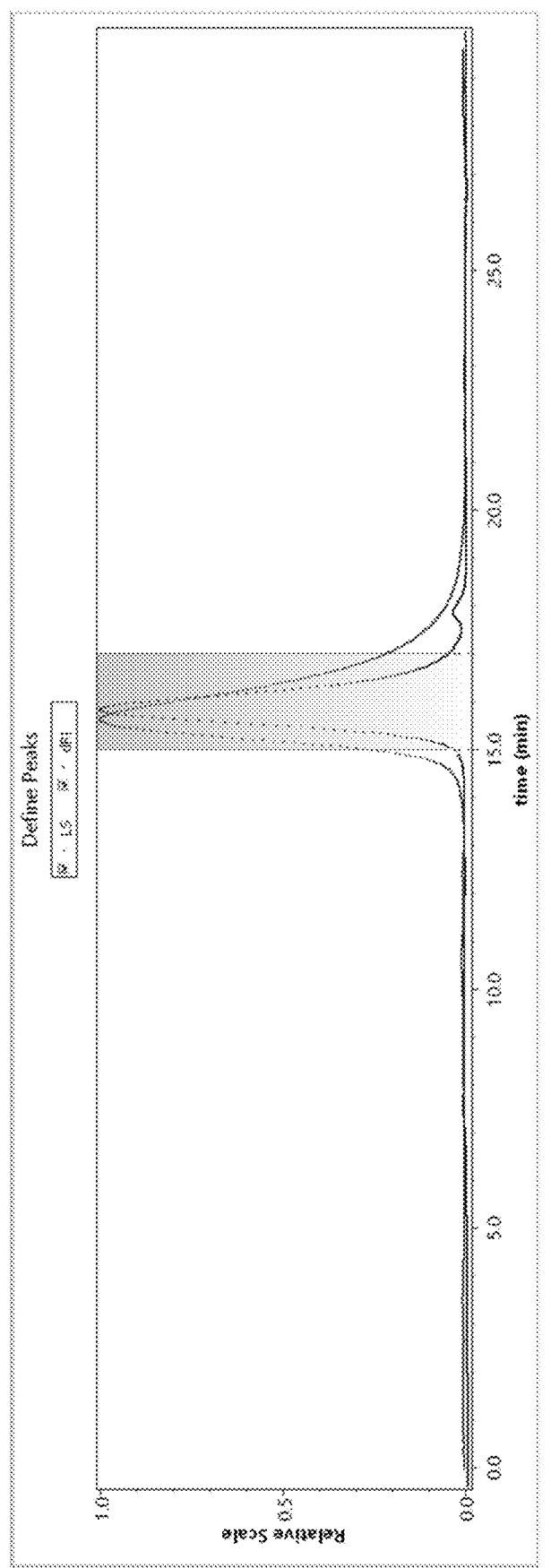
FIG. 6 shows the detection of mass average molar mass of Example 7.
Figure 7:
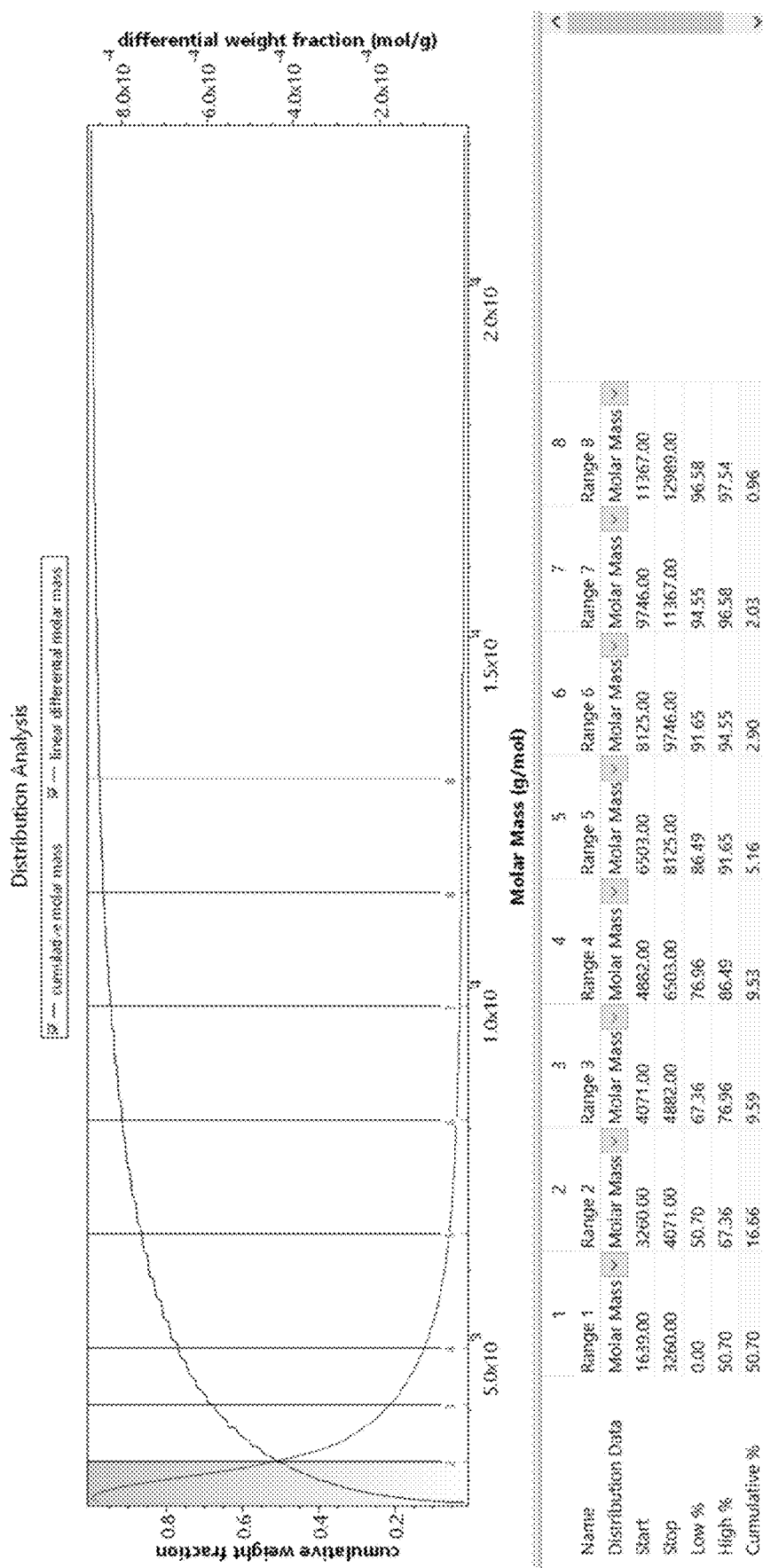
FIG. 7 shows the analysis of the distribution of degree of polymerization of Example 7.

The β-glucan compositions in this example were analyzed by high-performance gel permeation chromatography (HPGPC) combined with 18-angle laser light scatterer (MALLS) and differential detector (RI):

Determination method: β-glucan composition was prepared into solutions with different concentrations using 0.1 mol/L $Na_2SO_4$. The solutions were injected into the DNDC instrument in order from low to high concentrations, and the dn/dc of the β-glucan combination was calculated. High performance gel permeation chromatography (HPGPC) combined with 18-angle laser light scatterer (MALLS) and differential detector (RI) are used for analysis. The chromatographic conditions are: column TSK-Gel G3000PW (7.5×300 mm); mobile phase 0.1 mol/L $Na_2SO_4$; column temperature 35° C.; flow rate 0.5 mL/min; combined with differential detector and 18-angle laser detector. The weight-average molecular mass and distribution of the β-glucan composition were obtained by substituting the measured value of dn/dc (the results are shown in Table 1 and FIGS. 5-7).

The weight percentages of β-glucan of five glucose-ten glucose (Dp 5-10), β-glucan of ten glucose-twenty glucose, β-glucan of twenty glucose-twenty-five glucose, β-glucan of twenty-five glucose-thirty glucose, β-glucan of thirty glucose-forty glucose, β-glucan of forty glucose-fifty glucose, β-glucan of fifty glucose-sixty glucose, β-glucan of sixty glucose-seventy glucose, β-glucan of seventy glucose-eighty glucose, and β-glucan of greater than eighty glucose were calculated.

The results of Examples 2-7 are shown in Table 1.

|  | Dp < 10 | Dp 10-20 | Dp 20-25 | Dp 25-30 | Dp 30-40 | Dp 40-50 | Dp 50-60 | Dp 60-70 | Dp 70-80 | Dp > 80 |
|---|---|---|---|---|---|---|---|---|---|---|
| Example 2 | — | — | 16.5% | 36.4% | 22.8% | 9.1% | 5.6% | 4.4% | 5.2% | — |
| Example 3 | — | 52.4% | 12.6% | 6.2% | 9.7% | 5.3% | 3.1% | 2.2% | 1.6% | 7.0% |
| Example 4 | 26.1% | 48.1% | 6.3% | 3.9% | 5.3% | 2.8% | 2.1% | 1.4% | 0.9% | 3.2% |
| Example 5 | — | 72.6% | 6.8% | 5.1% | 4.8% | 2.6% | 2.2% | 1.2% | 0.7% | 4.0% |
| Example 6 | 42.2% | 48.0% | 4.0% | 2.1% | 2.0% | 0.8% | 0.4% | 0.2% | 0.3% | — |
| Example 7 | — | 50.7% | 16.7% | 9.6% | 9.5% | 5.2% | 2.9% | 2.0% | 1.0% |  |

Example 8 Identification of the Length of Side Chain of the β-Glucan

Figure 2:
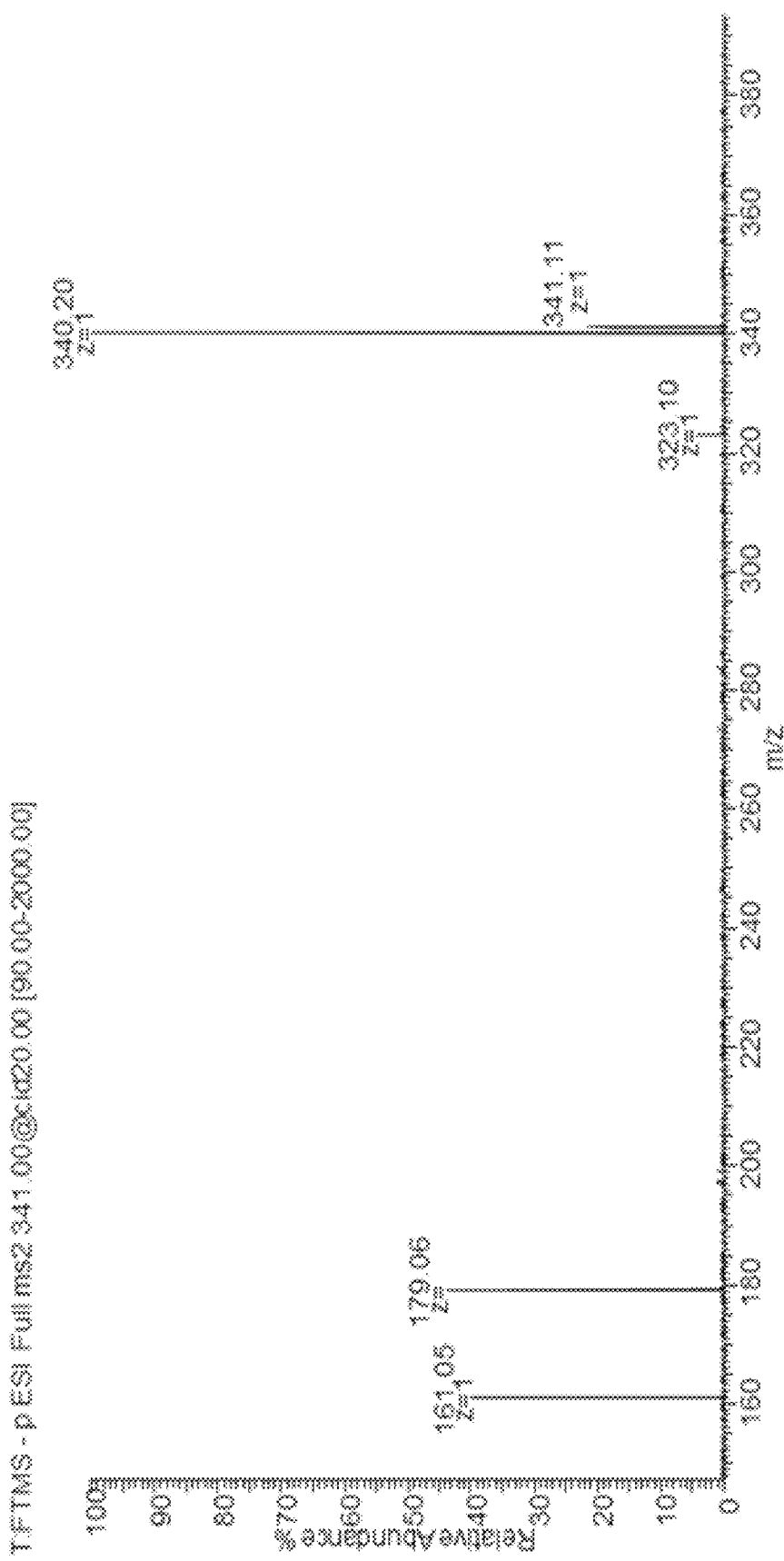
FIG. 2 shows the ESI-CID-MS/MS plot when the side chain is Glcβ1-3Glcβ3 of equation (IV).
Figure 3:
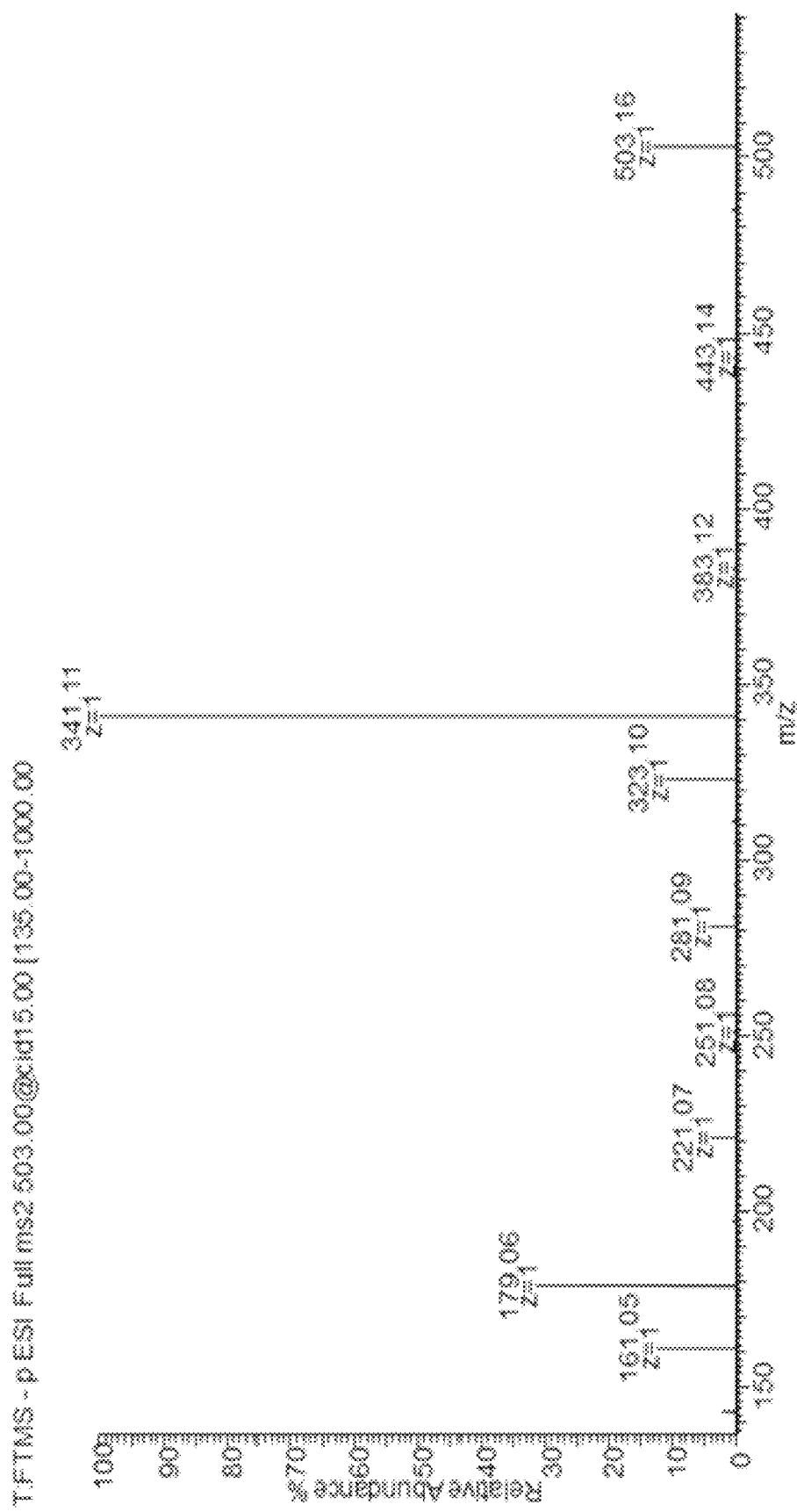
FIG. 3 shows the ESI-CID-MS/MS plot when the side chain has a structure of formula (V).
Figure 4:
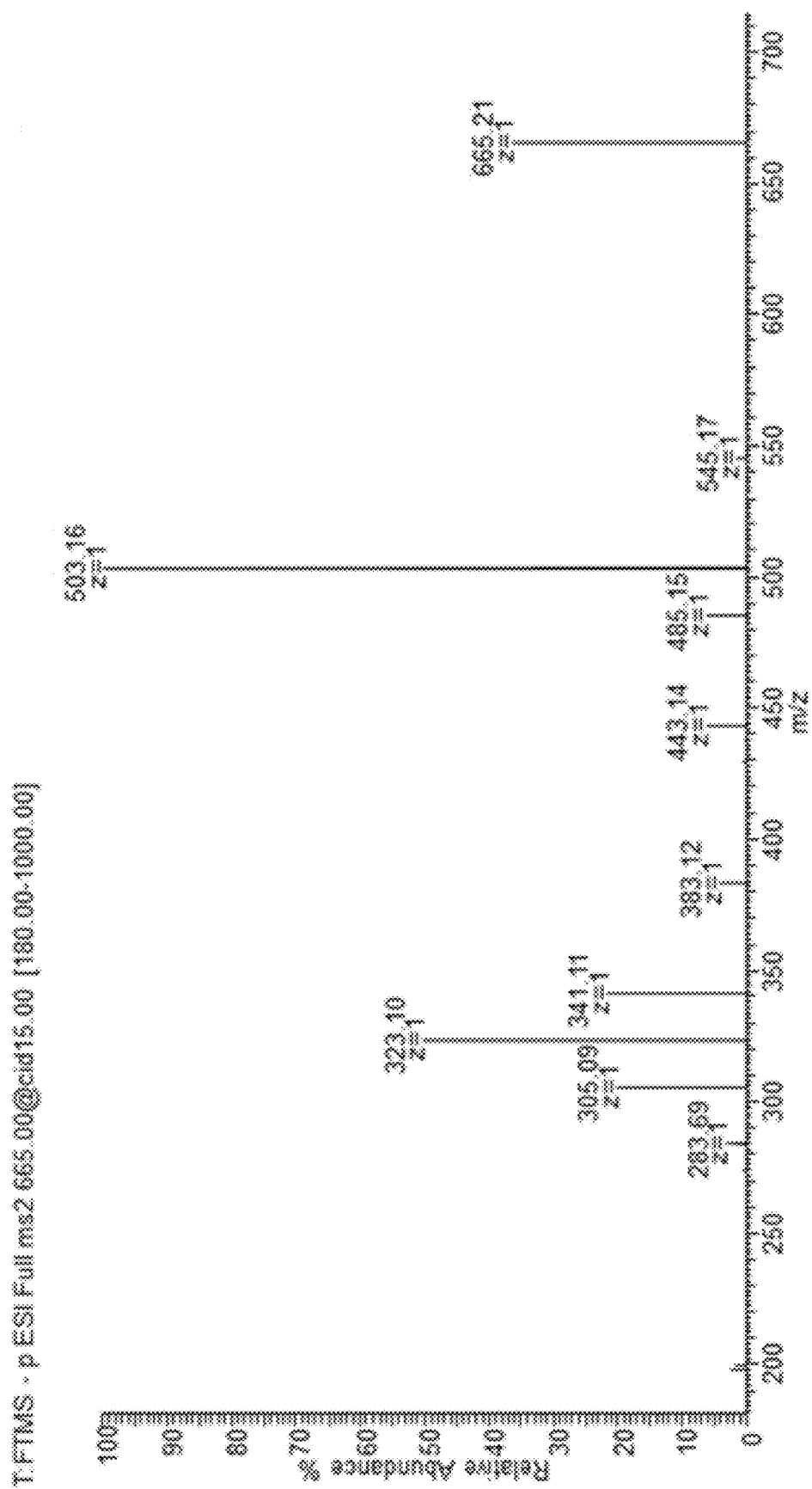
FIG. 4 shows the ESI-CID-MS/MS plot when the side chain has a structure of formula (VI).

1) Preparation of side chain oligosaccharides of the β-glucan compositions: β-glucan compositions were dissolved and prepared into a concentration of about 5%, 10 μL of endo-1,3-β-glucosidase was added and enzymatic digested at 40° C. for 8 h. The mixture was boiled for 10 min, centrifuged at 10000 rpm for 10 min using centrifuge, the supernatant was collected and lyophilized to obtain the side chain oligosaccharides of the β-glucan compositions.
2) The structure of the side chain oligosaccharides of the β-glucan compositions of the present invention were analyzed by ESI-CID-MS/MS. Conditions of mass spectrometry: LTQ-Qrbitrap XL mass spectrometer, capillary voltage being −3000 V, cone voltage for sample injection being −50 V, ion source temperature being 80° C., dissociation temperature being 150° C., sheath flow rate being 8 arb, sample flow rate being 3-5 μL/min. Collision gas being helium, and collision voltage being 15-30 eV.
3) The mass spectra of the side chain oligosaccharides of the β-glucan compositions with each degree of polymerization are shown in FIGS. 1-4. Each signal peak in the mass spectra was attributed and verified the molecular structures of the side chain oligosaccharides of the β-glucan compositions, i.e., the structures shown in general formula (III) or formula (IV) or formula (V) or formula (VI). Among them, FIG. 1 shows the mass spectra wherein the side chains are Glcβ1-6Glcβ in formula (IV), FIG. 2 shows the mass spectra wherein the side chains are Glcβ1-3Glcβ in formula (IV), FIG. 3 shows the mass spectra wherein the side chains are structures in formula (V), and FIG. 4 shows the mass spectra wherein the side chains are structures in formula (VI).

Example 9 Advanced Structural Information

Figure 8:
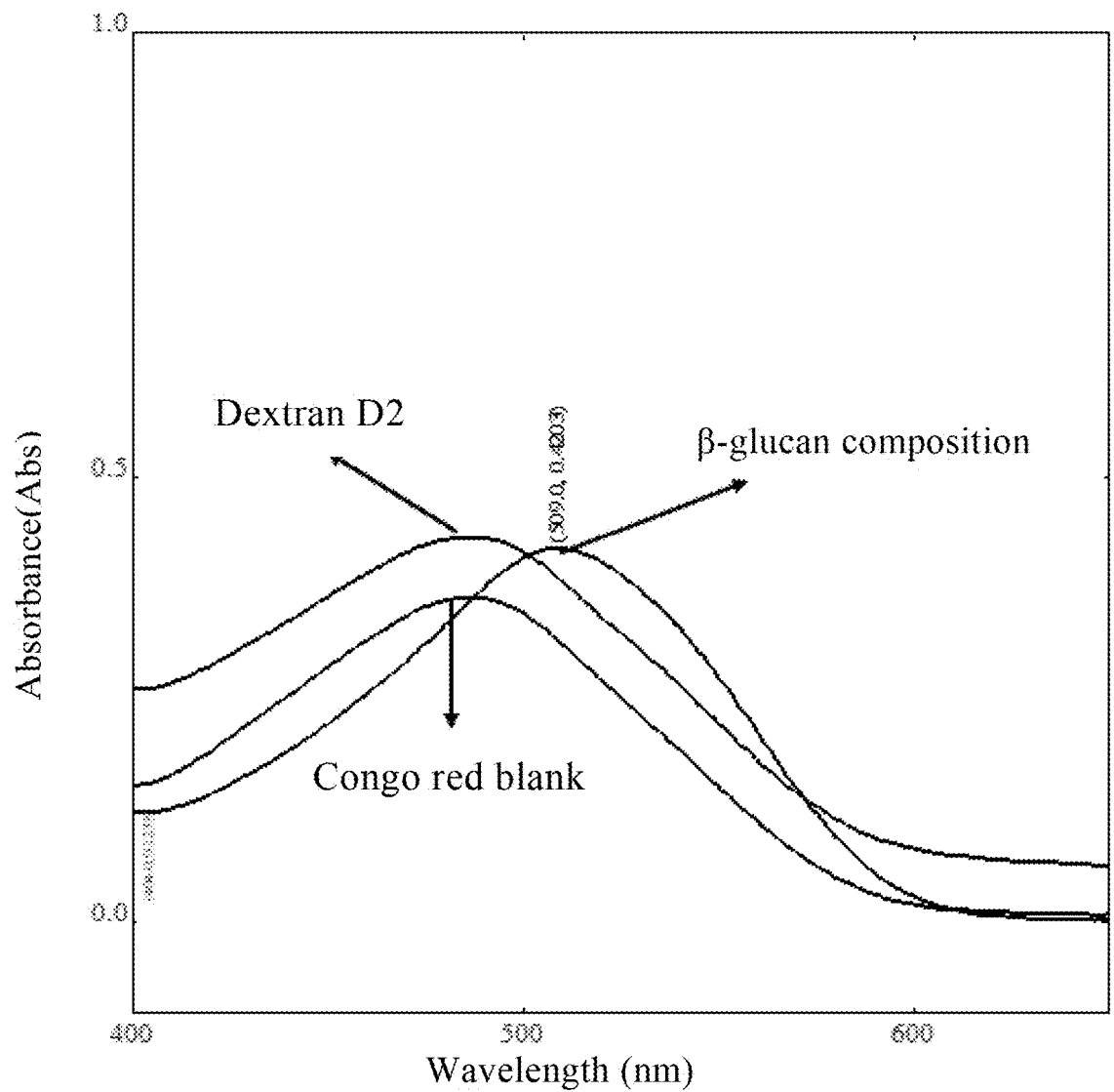
FIG. 8 shows that the composition of β-glucan shifts the maximum absorption wavelength of Congo red.

The β-glucan compositions of the present invention have a triple helix structure. Congo red can form complex with polysaccharides having conformation of triple helical chain, and the maximum absorption wavelength of the complex is red-shifted compared to that of Congo red. The β-glucan compositions of the present invention can form complex with Congo red under alkaline conditions, resulting in the maximum absorption wavelength red-shifted by more than 15 nm (FIG. 8).

Figure 9:
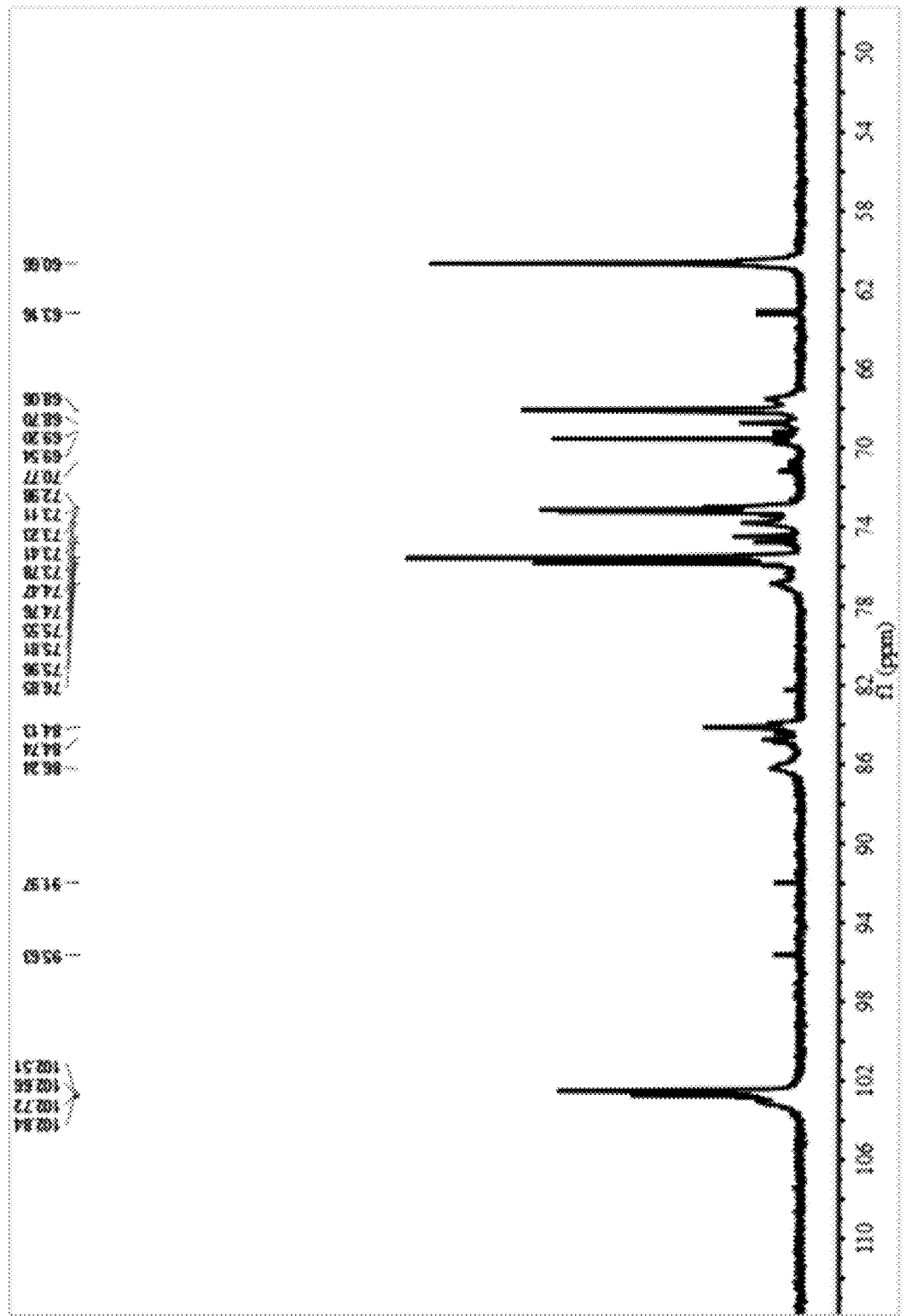
FIG. 9 shows the $^{13}$C-NMR spectra of the composition of β-glucan having a structure of formula (II).

The β-glucan compositions of the present invention have a sugar alcohol structure at the reducing end. The differences with the structure of formula (I) is that the structure of formula (II) has a sugar alcohol structure at the reducing end, as shown by a characteristic signal at 63.16 ppm in 13C-NMR (FIG. 9).

Figure 10:
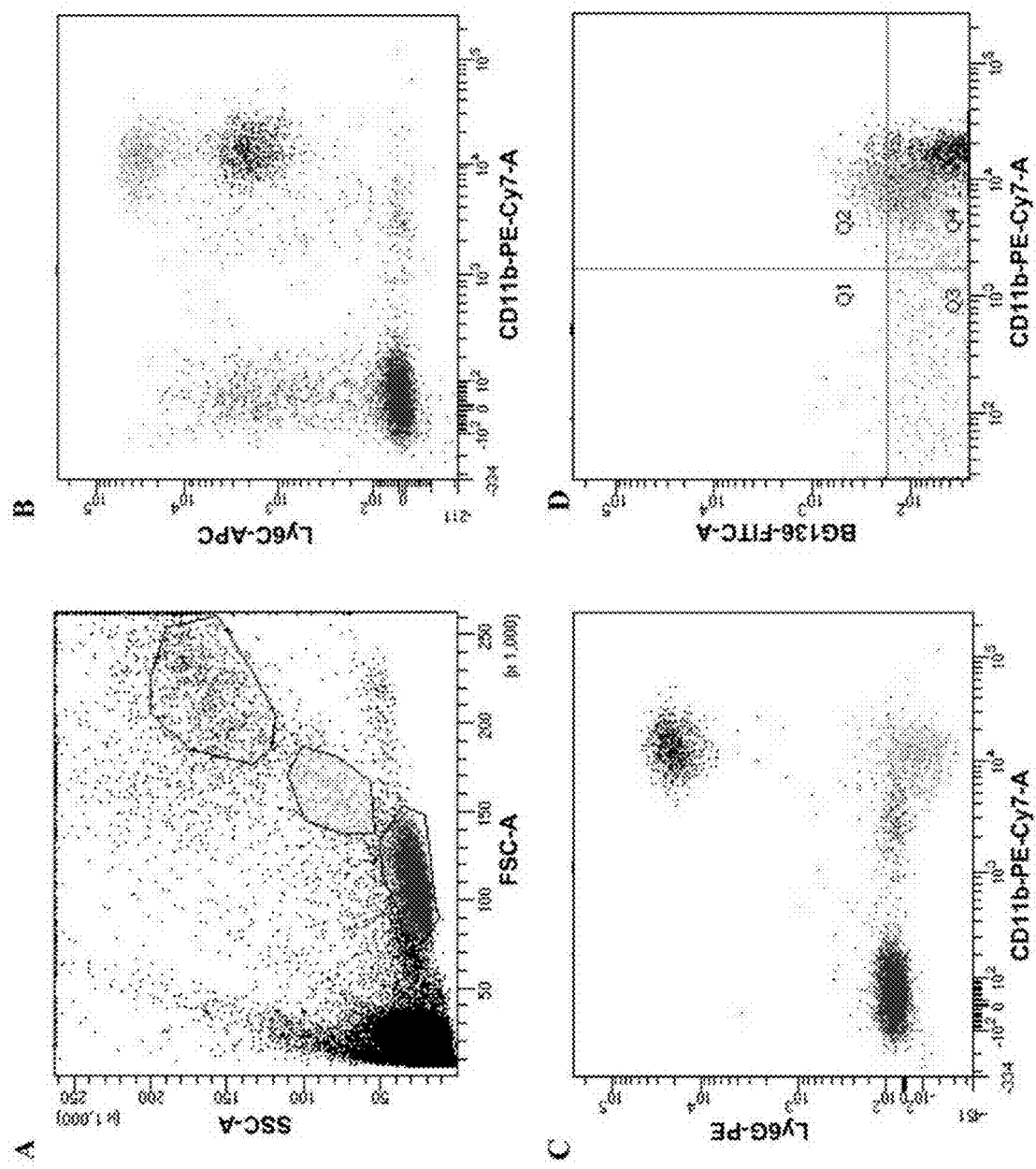
FIG. 10 shows that β-1,3/1,6-glucan has a higher affinity for monocytes than granulocytes. (A-C) Flow cytometric description of lymphocytes (red dots, CD11b−), monocytes (green dots, CD11b+Ly6Chi), and granulocytes (blue dots, CD11b+Ly6G+). (D) Blood cells were incubated with β-1,3/1,6-glucan-FITC (200 μg/ml) at 37° C. for 2 h. Then the red blood cells were lysed and the cells were stained with corresponding flow antibodies. The β-1,3/1,6-glucan-FITC binding affinity to the monocytes (Green, CD11b+) and granulocytes (Blue, CD11b+) was measured by flow cytometry.

Example 10: β-1,3/1,6-Glucan Enhances Phagocytosis of Bone Marrow-Derived Macrophages In this example, the binding affinity and selectivity of the β-1,3/1,6-glucan of the present invention to two major populations of intrinsic immune cells in peripheral blood, monocytes (CD11b+Ly6C$^{hi}$, FIGS. 10A and 10B) and granulocytes (CD11b+Ly6G+, FIGS. 10A and 10C), were detected. As shown in FIG. 10D, β-1,3/1,6-glucan-FITC binds to monocytes (12.8%) better and binds to very few granulocytes (1.5%).

Figure 11:
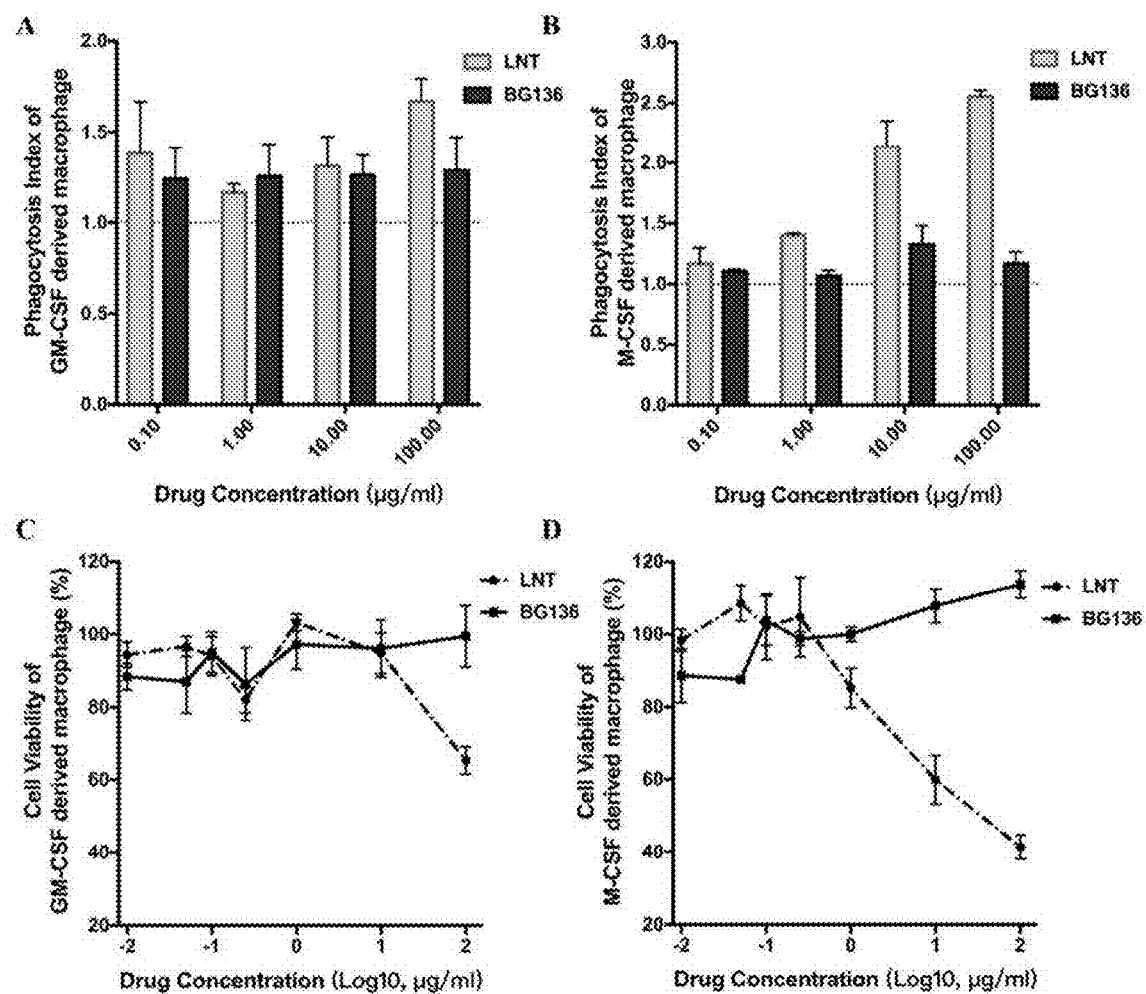
FIG. 11 shows that (β-1,3/1,6-glucan of the present invention increases the phagocytic activities of BMDMs without cytotoxicity. (A and B) The GM-BMDM (A) and M-BMDM (B) were treated with β-1,3/1,6-glucan or LNT for 24 h. The phagocytic activities of these two types of macrophages were detected by neutral red method. Cell viabilities were detected by MTT assay (C and D).

Next, the effect of β-1,3/1,6-glucan of the present invention on the phagocytic activity of differentially polarized BMDMs was evaluated. Phagocytic activity of macrophages GM-BMDMs and M-BMDMs are slightly up-regulated by β-1,3/1,6-glucan, FIGS. 11A and B. When the dose is higher than 10 μg/ml, the cytophagocytosis of structurally similar β-glucan LNT was higher than that of β-1,3/1,6-glucan of the present invention (FIG. 11B). However, as shown in FIGS. 11C and 11D, LNT significantly reduced the cell survival of BMDMs in a dose-dependent manner. No cytotoxicity was observed for β-1,3/1,6-glucan of the present invention even at a concentration of 100 μg/ml.

Example 11: The β-1,3/1,6-Glucan of the Present Invention Reduces the Tumor Burden and Improves the Spleen Index in a Tumor Transplantation Mouse Model Blood monocytes are recruited into the tumor microenvironment differentiating into macrophages, creating an immunosuppressive and tumor promoting microenvironment. Remodeling immunosuppressive macrophages into pro-inflammatory state will manipulate the tumor microenvironment and hinder tumor growth in the body. The antitumor effect of the β-1,3/1,6-glucan of the present invention in a xenograft mouse model with human colorectal cancer cell DLD1 was tested.

Figure 12:
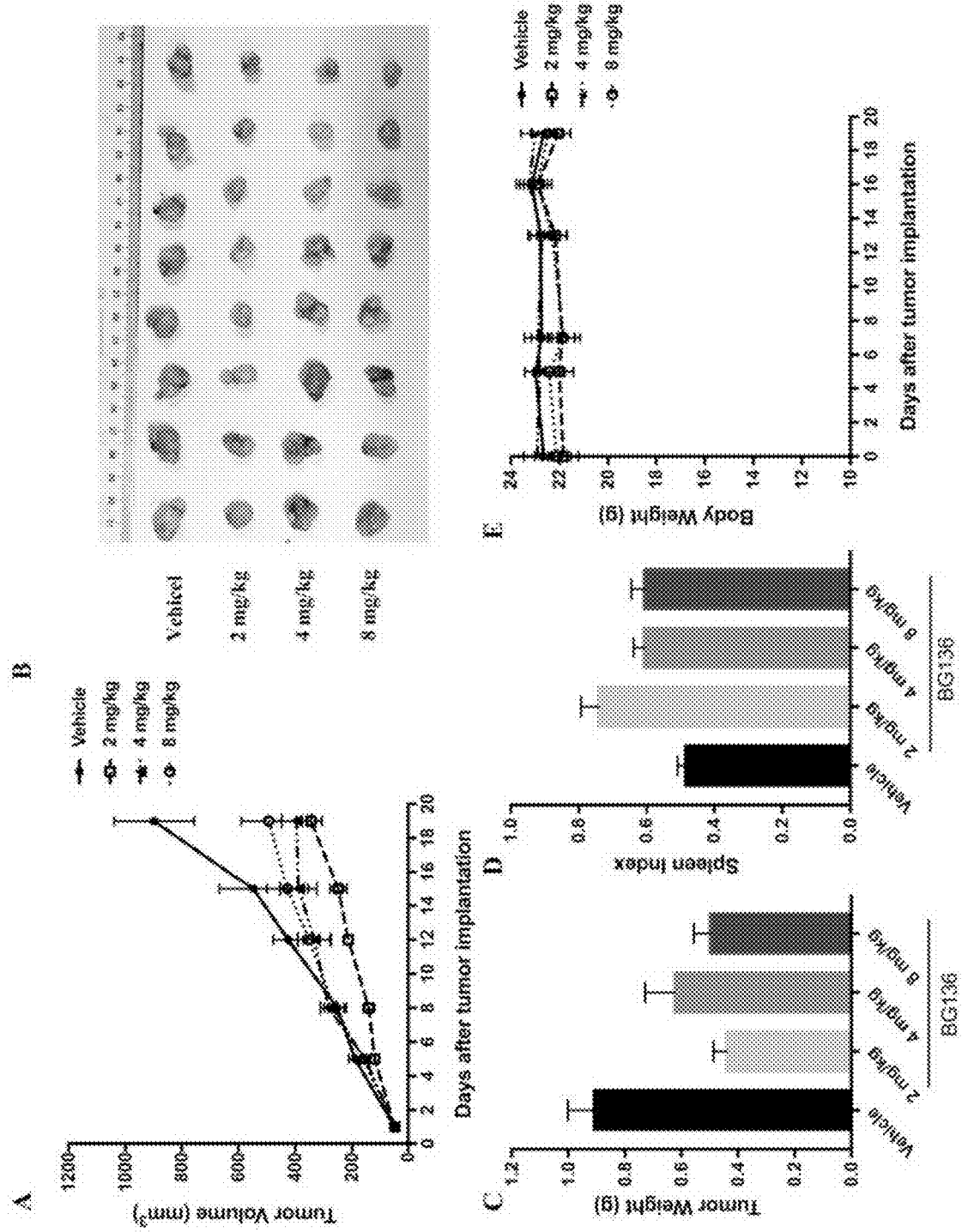
FIG. 12 shows that β-1,3/1,6-glucan of the present invention reduces tumor burden and improves spleen index in DLD1 xenograft mouse model. Mice implanted with DLD1 tumors were treated with vehicle or the β-1,3/1,6-glucan of the present invention. Tumor volume (A) and body weight (E) were shown. The tumors were excised, photographed (B), weighed (C), and the splenic indexes were calculated (D).

As shown in FIGS. 12A-C, the β-1,3/1,6-glucan of the present invention inhibits tumor volume (FIG. 12A, FIG. 12B) and tumor weight (FIG. 12C). It is worth noting that, unlike classical chemotherapeutic compounds, the β-1,3/1,6-glucan of the present invention does not depend on the dose to inhibit tumor growth. a low dose of 2 mg/kg of β-1,3/1,6-glucan has stronger inhibitory effect on tumor growth than high dose (4 mg/kg and 8 mg/kg) (FIG. 12A). As an immune stimulating factor, the β-1,3/1,6-glucan of the present invention significantly up-regulates the spleen index of tumor-bearing mice, suggesting the increase of activation and infiltration of immune cells (FIG. 12D). Each treatment has no significant effect on the body weight of the mice (FIG. 12E).

Example 12: The β-1,3/1,6-Glucan of the Present Invention Up-Regulates the in Vitro Phagocytic Activity and the Secretion of Pro-Inflammatory Cytokines/Chemokines of Macrophages In this example, the peritoneal macrophages of mice in the control group and the β-1,3/1,6-glucan treatment group of the present invention were induced and co-cultured with 9 different colorectal cancer cell lines, the phagocytosis of macrophages were measured.

Figure 13:
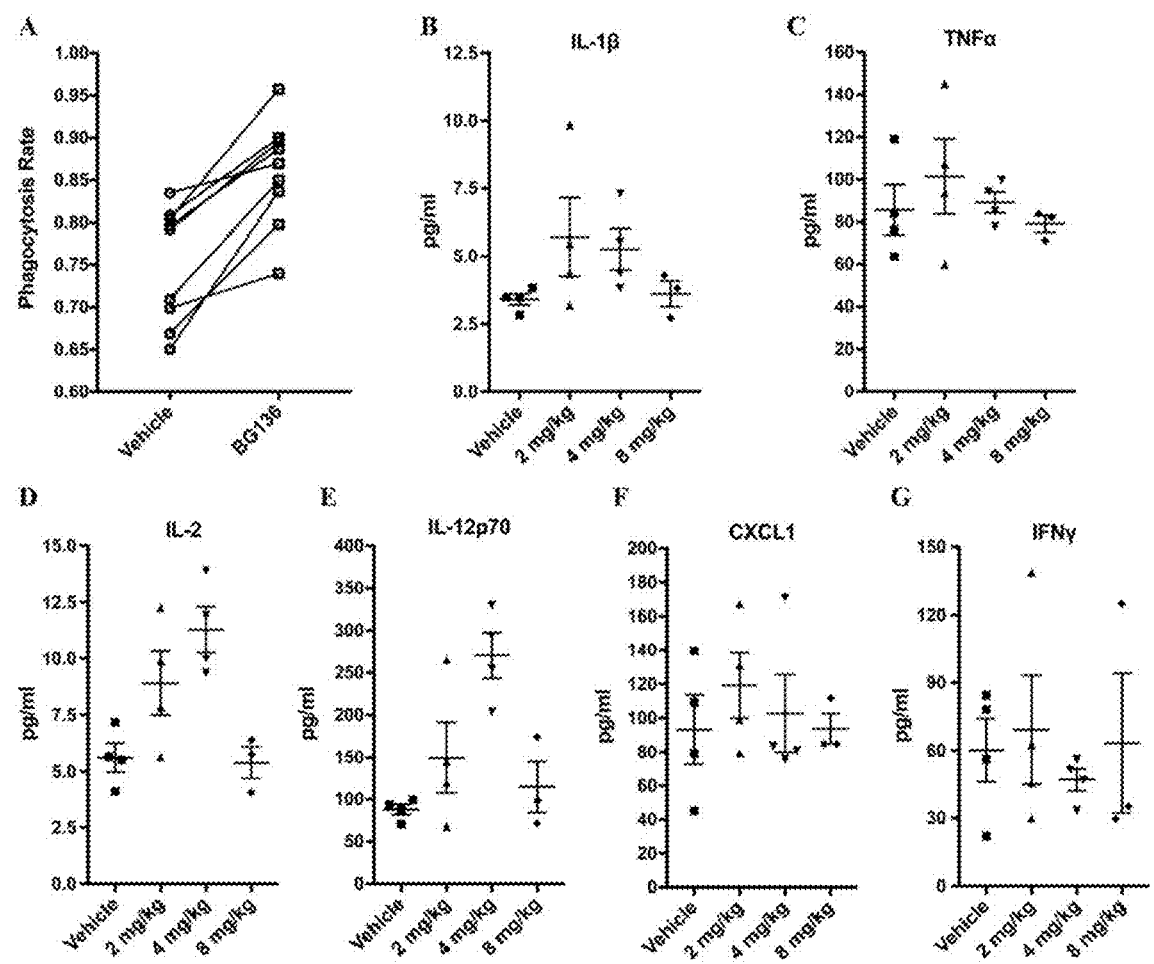
FIG. 13 shows that β-1,3/1,6-glucan of the present invention upregulates the phagocytic activity of macrophages and the secretion of proinflammatory cytokines in DLD I xenograft model. (A) Phagocytosis of nine colorectal cancer cell lines (HCT-116, LS174T, SW480, DLD1, HT-29, LS180, HCT-15, LOVO and T84) by peritoneal macrophages from mice treated with vehicle or β-1,3/1,6-glucan of the present invention were detected. (B-G) The proinflammatory cytokine and chemokine levels in plasma from mice treated with vehicle or β-1,3/1,6-glucan of the present invention were tested using V-PLEX mouse inflammatory factors Kit (LabEx).

As shown in FIG. 13A, the induced macrophages in the mice of β-1,3/1,6-glucan group shows strong phagocytic activity on all the cancer cell lines that we tested. The secretion of cytokines and chemokines are important indicators of the activation of the body's immune function. The β-1,3/1,6-glucan of the present invention strongly increased the secretion of pro-inflammatory cytokines (IL-1β and TNFα, which are mainly secreted by monocytes/macrophages). β-1,3/1,6-glucan treatment also upregulates the expression levels of pro-inflammatory cytokines such as IL-2, IL12p70 and chemokine CXCL I produced by immune cells such as macrophages. The IFNγ level in mice of 2 mg/kg or 4 mg/kg β-1,3/1,6-glucan group slightly increased. These data suggest that the β-1,3/1,6-glucan of the present invention not only triggers the phagocytic activity of macrophages in vivo, but also promotes the secretion of pro-inflammatory cytokines/chemokines, and exerts anti-tumor effects.

Example 13: The β-1,3/1,6-Glucan of the Present Invention Increases the Infiltration of Pro-Inflammatory Macrophages and B Cells in the Tumor Microenvironment The composition of immune cells in the circulating blood system was detected. It was found that the ratio of B cells (CD19+) and dendritic cells (CD11c+) increased, while the ratio of myeloid cells (CD11b+) slightly decreased (FIG. 14A). β-1,3/1,6-glucan treatment induced the formation of myeloid subpopulations, pro-inflammatory monocyte-derived macrophages (CD11b+Ly6Chi) (FIG. 14B).

The tumor was dissected and the percentage of tumor-infiltrated immune cells were calculated. In the tumor, the percentage of myeloid cells (CD11b+) after treatment with β-1,3/1,6-glucan of the present invention are slightly up-regulated (FIG. 14C). In addition, β-1,3/1,6-glucan promotes the infiltration of pro-inflammatory monocyte-derived macrophage subpopulations (CD11b+Ly6Chi) (FIG. 14D).

Figure 14:
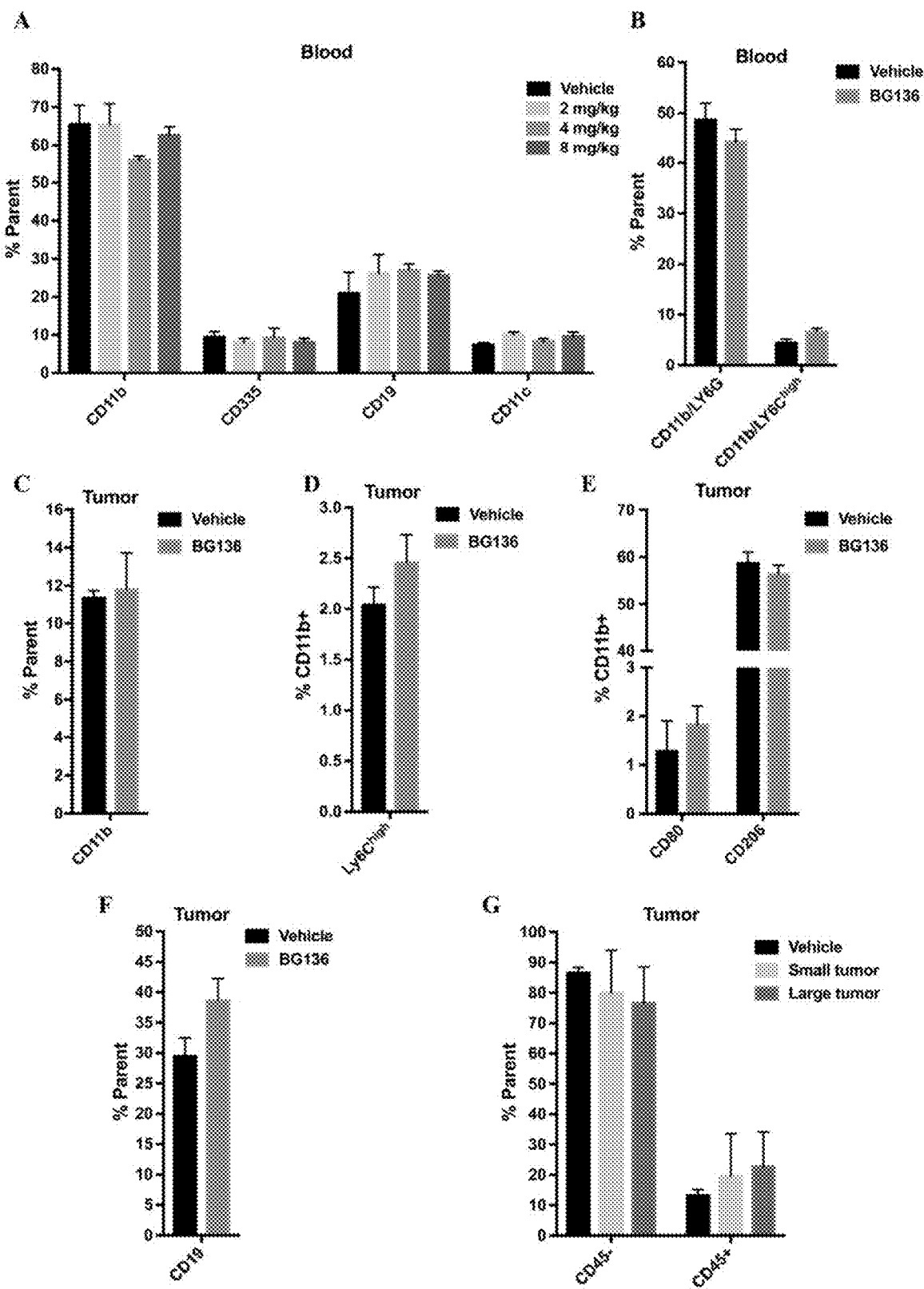
FIG. 14 shows that β-1,3/1,6-glucan of the present invention increases the proinflammatory macrophages and B cells in the tumor microenvironment. (A) The proportion of CD11b+, CD335+, CD19+, CD11c+ cells in the blood were measured by flow cytometry. (B) The proportion of neutrophils (CD11b+LY6G+) and proinflammatory monocytes (CD11b+LY6Chi) in the blood were measured. (C-F) The proportion of the tumor infiltrated CD11b+ cells, monocytes-derived infiltrated macrophages (CD11b+LY6Chi), the TAMs (CD11b+CD80+ or CD11b+CD206+), and CD19+ cells were measured. (G) The proportion of CD45+ leukocytes in the tumors of mice treated with vehicle and β-1,3/1,6-glucan of the present invention (small tumor group and large tumor group) were measured.

Compared to control group, antitumoral pro-inflammatory tumor-associated macrophages (TAMs) (CD11b+CD80+) are upregulated and protumoral immunosuppressive TAMs (CD11b+CD206+) are downregulated in the mice treated with β-1,3/1,6-glucan of the present invention (FIG. 14E). These data suggest that the treatment with β-1,3/1,6-glucan of the present invention modulates the proportion of antitumoral myeloid cells in tumor. Consistent with the induction of B cells in the blood system, the proportion of infiltrated B cells also increased after treatment with β-1,3/1,6-glucan of the present invention (FIG. 14F). Therefore, the β-1,3/1,6-glucan of the present invention can modulate the composition of systemic and intratumoral immune cells, make them in a pro-inflammatory and anti-tumor state, thereby hindering tumor growth in vivo.

The β-1,3/1,6-glucan-treated tumors were grouped according to their volume to examine immune cell (CD45+) infiltration. The large tumors refer to tumors with volumes above average in the group treated with β-1,3/1,6-glucan of the present invention, and vice versa. As shown in FIG. 14F, all the tumors treated with β-1,3/1,6-glucan of the present invention contain more immune cells (CD45+). In addition, there is more immune cell infiltration in the large tumors than in the small tumors. In summary, these results suggest that the β-1,3/1,6-glucan of the present invention may trigger the tumor infiltration of immune cells such as pro-inflammatory macrophages and the like in vivo and inhibit the growth of cancer cells.

Figure 15:
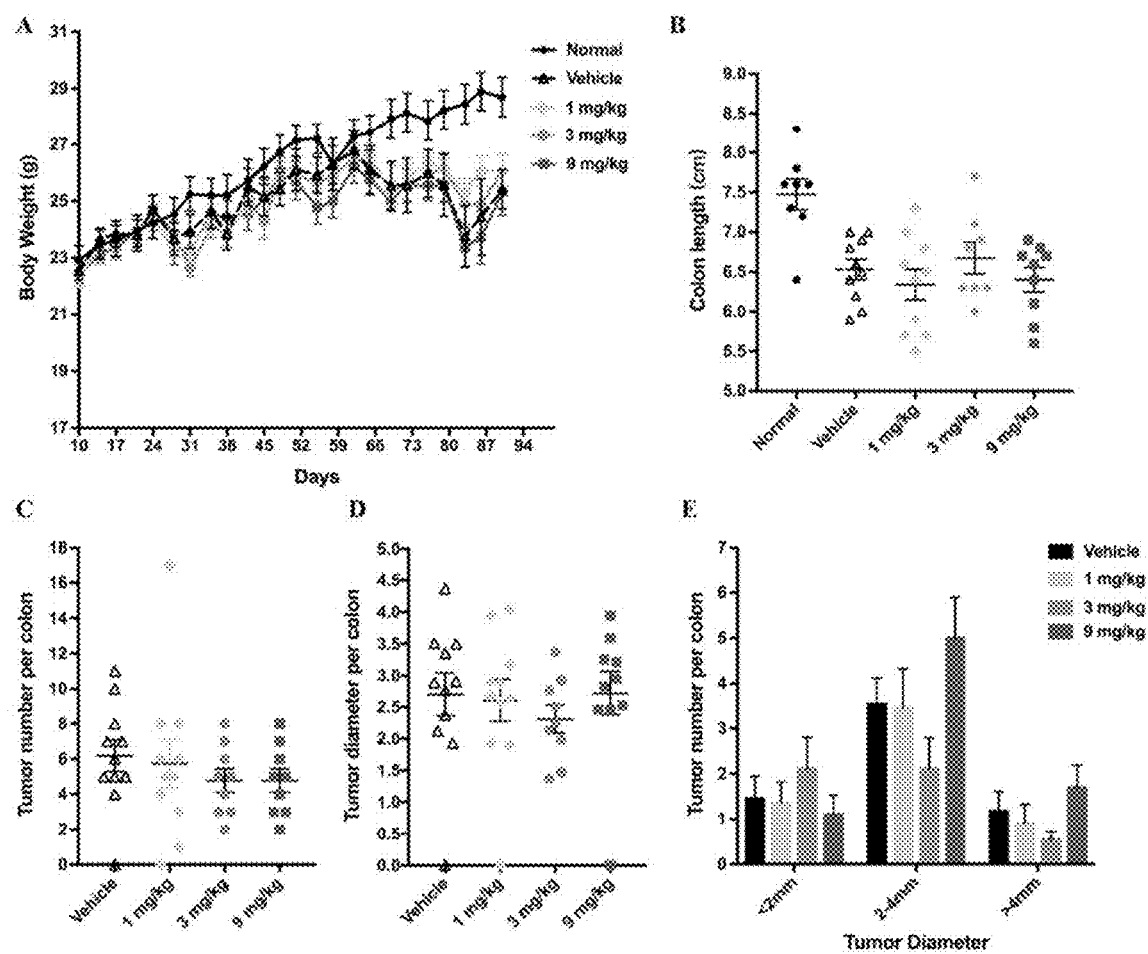
FIG. 15 shows that β-1,3/1,6-glucan of the present invention reduces the tumor burden in AOM-DSS induced colorectal cancer model. C57 mice untreated group or AOM/DSS-induced group, or the group treated with β-1,3/1,6-glucan (1, 3 and 9 mg/kg) of the present invention after inducement. (A) Body weights of all groups after treatment were recorded. (B) Colon length measured after sacrifice. (C-E) Colons being opened longitudinally, the number of collected tumors (C and E) and diameters (D).

Example 14: β-1,3/1,6-Glucan of the Present Invention Reduces Tumor Burden in AOM-DSS-Induced Colorectal Cancer Model To verify the antitumor effects of β-1,3/1,6-glucan of the present invention in the immunocompetent mice, the antitumor effects of β-1,3/1,6-glucan were tested in the AOM/DSS-induced colorectal cancer model in C57BL/6J mice. At the late stage of tumor progression, the body weights of the β-1,3/1,6-glucan groups are higher than that of the vehicle group at both doses of 1 mg/kg and 3 mg/kg, indicating better physical condition in these treated mice (FIG. 15A). No significant differences in colonic length are found, except that β-1,3/1,6-glucan treatment at 3 mg/kg slightly increases colonic lengths (FIG. 15B). Even after β-1,3/1,6-glucan treatment at a low dose of 1 mg/kg, the number of induced colorectal tumors per mouse is reduced (FIG. 15C). As shown in FIG. 15D, the number of tumors with diameters of 2 mm-4 mm and above 4 mm is reduced after β-1,3/1,6-glucan treatment at a dose of 3 mg/kg. After the use of AOM/DSS, the number of induced tumors with diameters over 4 mm treated with 1 mg/kg of β-1,3/1,6-glucan of the present invention is less than that treated with vehicle (FIG. 15E).

Figure 16:
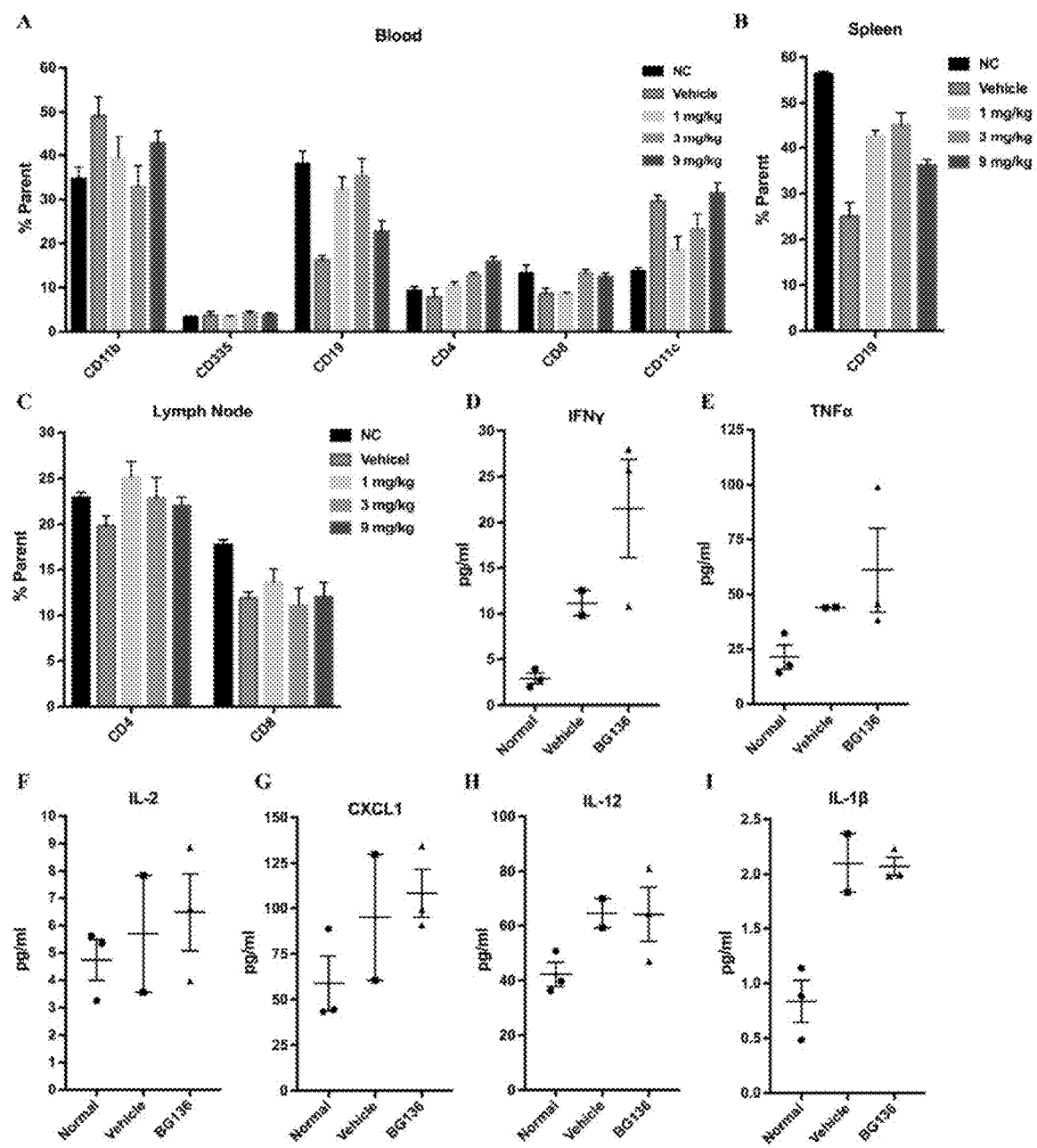
FIG. 16 shows that β-1,3/1,6-glucan of the present invention reverses the changes in immune cell composition caused by AOM-DSS administration. (A-D) The proportion of CD11b+, CD335+, CD19+, CD4+, CD8+ and CD11c+ in the blood (A), the proportion of CD19+ in spleen (B), and the proportion of CD4+ and CD8+ in lymph node (C) were detected. (E, F, G, H, I) The proinflammatory cytokine and chemokine levels in plasma of normal or AOM/DSS mice treated with β-1,3/1,6-glucan of the present invention or untreated were tested, respectively.

Example 15: Reversal of AOM-DSS-Induced Immune Cell Composition Changes by β-1,3/1,6-Glucan of the Present Invention Changes of various types of immune cells including myeloid cells (CD11b+) were observed after AOM/DSS induction and treatment with β-1,3/1,6-glucan of the present invention. AOM/DSS increases the proportion of myeloid cells (CD11b+) in the circulating blood system, and treatment with the β-1,3/1,6-glucan of the present invention reversed this trend (FIG. 16A). At the same time, β-1,3/1,6-glucan increases the downregulated B cells in blood (FIG. 16A) and spleen (FIG. 16B) induced by administration of AOM/DSS in vivo, as well as reverses the decrease of CD4 T cells in blood (FIG. 16A) and lymph nodes (FIG. 16C). Thereof, β-1,3/1,6-glucan treatment reverses the changes of immune cell composition caused by administration of AOM/DSS. Furthermore, β-1,3/1,6-glucan of the present invention induces upregulation of secreted inflammatory factor IFNγ (FIG. 16D), TNF-α, etc. and chemokine CXCL1 (FIG. 16E, FIG. 16F, FIG. 16G, FIG. 16H, and FIG. 16I).

These data suggest that the antitumor effect of β-1,3/1,6-glucan of the present invention in immunocompetent mice is related to the regulation of immune cell composition and the secretion of pro-inflammatory cytokines/chemokines as immunostimulatory factors.

Example 16: Inhibitory Effect of β-1,3/1,6-Glucan of the Present Invention on Nude Mice Inoculated with Sporadic Human Colon Cancer Cell Lines The mouse colon cancer cell line HCT-116 was resuscitated with liquid nitrogen and cultured in 5A medium containing 10% fetal bovine serum; the cells were expanded and cultured in culture flasks and collected by digestion after reaching the required cells number; the cells were diluted using 5A medium containing 10% fetal bovine serum into suspensions of 250 million cell/ml which was inoculated subcutaneously to the axilla of the right forelimb of each mouse with 0.2 ml per mouse after routine sterilization. When growing to tumors to about 1 g of tissue mass, the animal was sacrificed and the tumor was cut into 2-3 cubic millimeter pieces and implanted subcutaneously into nude mice for passaging by catheter method, and two consecutive passages were performed. HT-29, SW-480, DLD-1 and RKO cell lines listed in the table were modeled and experimented using the same method. Waiting for the tumors of the passaged tumor-bearing nude mice grown to about 1 g, the tumors were transplanted for modeling via the method described above, and the animals were randomly grouped and administration was started on the next day after transplantation.

The animals were grouped using the random grouping method, 8 animals each group. The dosages of administration for each group of animals were shown in the following table.

| Group | Drug | Dose (mg/kg) | Concentration (mg/mL) | Volume (mL/kg) |
|---|---|---|---|---|
| vehicle control group (model group) | — | — | — | 10 |
| Fluorouracil Group | Fluorouracil injection | 18 | 1.8 | 10 |
| Lentinan Group | Lentinan for injection | 2 | 0.2 | 10 |
| β-1,3/1,6-glucan low-dose group | β-1,3/1,6-glucan | 1.0 | 0.1 | 10 |
| β-1,3/1,6-glucan medium dose group | β-1,3/1,6-glucan | 3.0 | 0.3 | 10 |
| β-1,3/1,6-glucan high dose group | β-1,3/1,6-glucan | 9.0 | 0.9 | 10 |

The route of administration is via tail vein injection, and the amount of administration for each animal was determined based on the latest body weight prior to administration. Each group was administered twice a week, and administered continuously until the end of the experiment. After the end of the experiment, tumor tissues need to be peeled off from accidentally dead animals or surviving animals after euthanasia, and tumor weight was weighed to calculate the difference in tumor weight among each group as well as to further calculate the tumor inhibition rate $IR_{TW}$ as a reference index, the calculation formula is as follow.

$$IR_{TW}(\%) = (W_{Model\ group} - W_{Administration\ group}) / W_{Model\ group} \times 100\%$$

From the results in the table, it can be seen that β-1,3/1,6-glucan of the present invention exhibits comparatively significant inhibitory effects on the growth of HCT-116, HT-29, SW-480, DLD-1 and RKO cell human colon cancer xenogeneic BALB/c nude mice transplanted tumors under the experimental conditions of dosing at 1 mg/kg, 3 mg/kg and 9 mg/kg and twice a week.

| Corresponding Tumor | Vehicle control Tumor weight g | 5-FU 18 mg/kg Tumor weight g | 5-FU 18 mg/kg Inhibition rate % | Lentinan 2 mg/kg Tumor weight g | Lentinan 2 mg/kg Inhibition rate % | B-1,3/1,6-glucan 1 mg/kg Tumor weight g | B-1,3/1,6-glucan 1 mg/kg Inhibition rate % | B-1,3/1,6-glucan 3 mg/kg Tumor weight g | B-1,3/1,6-glucan 3 mg/kg Inhibition rate % | B-1,3/1,6-glucan 9 mg/kg Tumor weight g | B-1,3/1,6-glucan 9 mg/kg Inhibition rate % |
|---|---|---|---|---|---|---|---|---|---|---|---|
| HCT-116 (sensitive type) | 1.45 ± 0.84 | 0.52 ± 0.25 | 64.40 | 0.80 ± 0.43 | 44.91 | 0.84 ± 0.34 | 42.04 | 0.67 ± 0.48 | 53.85 | 0.60 ± 0.33 | 58.73 |
| | 0.98 ± 0.27 | 0.50 ± 0.15 | 49.02 | 0.74 ± 0.30 | 27.27 | 0.70 ± 0.25 | 28.11 | 0.52 ± 0.14 | 47.13 | 0.71 ± 0.26 | 27.16 |
| HT-29 | 1.41 ± 0.46 | 0.81 ± 0.12 | 42.80 | 0.79 ± 0.15 | 44.19 | 0.75 ± 0.2 | 37.43 | 0.84 ± 0.38 | 40.41 | 0.88 ± 026 | 46.65 |
| | 1.21 ± 0.30 | 0.30 ± 0.21 | 75.01 | 0.81 ± 0.16 | 33.04 | 0.82 ± 0.30 | 32.2 | 0.69 ± 0.26 | 42.10 | 0.90 ± 020 | 25.0 |
| SW-480 | 1.01 ± 0.53 | 0.43 ± 0.22 | 57.91 | 0.80 ± 0.53 | 20.72 | 0.87 ± 0.42 | 13.86 | 0.64 ± 0.22 | 36.52 | 0.56 ± 0.45 | 45.08 |
| RKO (Insensitive p53 wild type) | 1.38 ± 0.31 | 0.44 ± 0.17 | 68.34 | 0.82 ± 0.21 | 40.70 | 1.21 ± 0.34 | 12.10 | 1.12 ± 0.23 | 18.73 | 0.88 ± 0.27 | 36.27 |
| | 2.21 ± 1.24 | 1.27 ± 0.54 | 42.30 | 1.39 ± 1.68 | 36.88 | 1.73 ± 0.34 | 21.42 | 1.47 ± 1.18 | 35.51 | 2.15 ± 1.05 | 2.67 |

Example 17 Inhibitory Effect of β-1,3/1,6-Glucan of the Present Invention on the Murine S180 Sarcoma Residual Carcinoma Model S180 mouse fibrosarcoma cells were amplified by culturing in DMEM high sugar medium containing 10% FBS. The cells were ready for the next step when entering the logarithmic growth phase. The cells at logarithmic growth phase were collected by centrifugation and counted. The cell concentration was adjusted, and inoculated at 0.2 ml/mouse into the peritoneal cavity of Kunming mice as the first-generation breeder mouse. After rearing for one week, the ascites in peritoneal cavity of the first-generation breeder mouse were taken for centrifugation and count, the cell concentration was adjusted, and inoculated at 0.2 ml/mouse into the peritoneal cavity of Kunming mice as the second-generation breeder mouse, and after rearing for another week, the ascites in peritoneal cavity of the second-generation breeder mouse were taken for centrifugation and count, the cell concentration was adjusted, and inoculated at 0.2 ml/mouse into subcutaneous back of Kunming mice. The whole inoculation process was carried out aseptically in the ultra-clean workstation. After inoculation, the growth of mice was observed, and the mice were screened according to their growth state, and after screening, the mice were grouped randomly and administered. The experimental results are shown in the table below. 3 mg/kg of β-1,3/1,6-glucan can significantly inhibit the regrowth of tumors after surgery.

| Corresponding Tumor | Vehicle control Tumor weight g | 5-FU 18 mg/kg | | Lentinan 2 mg/kg | | B-1,3/1,6-glucan 3 mg/kg | |
|---|---|---|---|---|---|---|---|
| | | Tumor weight g | Inhibition rate % | Tumor weight g | Inhibition rate % | Tumor weight g | Inhibition rate % |
| S180 | 1.48 ± 0.51 | 0.22 ± 0.13 | 85.30 | 0.6 ± 0.31 | 59.76 | 0.4 ± 0.2 | 72.88 |
| | 3.16 ± 1.01 | 1.05 ± 0.43 | 66.85 | 0.7 ± 0.3 | 77.83 | 0.49 ± 0.26 | 84.42 |

Example 18 Inhibitory Effect of β-1,3/1,6-Glucan of the Present Invention on the Mouse Lewies Lung Cancer Residual Cancer Model Mouse lung cancer Lewis cells were amplified by culturing in DMEM high sugar medium containing 10% FBS. The cells were ready for the next step when entering the logarithmic growth phase. The cells at logarithmic growth phase were collected by centrifugation and counted. The cell concentration was adjusted and inoculated subcutaneously at 0.2 ml/mouse in the right axilla of C57BL/6 mice as breeder mouse. After grew to over 1000 mm$^3$, the tumors were removed aseptically, weighed, diluted by adding sodium chloride injection with mass to volume ratio of 1:4 and around, after conventional sterilization, inoculated subcutaneously to the axilla of the right forelimb of each mouse with 0.2 ml per mouse for passaging. After grew to over 1000 mm$^3$, the second generation tumors were taken aseptically, weighed, diluted by adding sodium chloride injection with mass to volume ratio of 1:4 and ground, and then inoculated subcutaneously to the back of mice at 0.2 ml per mouse after routine sterilization. The growths of mice were observed after inoculation, and screened according to the growth state of mice, and after screening, the mice were grouped randomly and administered. The experimental results are shown in the table below, β-1,3/1,6-glucan of the present invention, at 1 mg/kg, 3 mg/kg and 9 mg/kg. can significantly inhibit the regrowth of tumor after surgery.

| Corresponding Tumor | Vehicle control Tumor weight g | 5-FU 18 mg/kg | | Lentinan 2 mg/kg | | B-1,3/1,6-glucan 1 mg/kg | | β-1,3/1,6-glucan 3 mg/kg | | β-1,3/1,6-glucan 9 mg/kg | |
|---|---|---|---|---|---|---|---|---|---|---|---|
| | | Tumor weight g | Inhibition rate % | Tumor weight g | Inhibition rate % | Tumor weight g | Inhibition rate % | Tumor weight g | Inhibition rate % | Tumor weight g | Inhibition rate % |
| Lewis | 1.54 ± 0.32 | 1.29 ± 0.14 | 15.81 | 1.78 ± 0.42 | −15.74 | 0.91 ± 0.23 | 40.82 | 0.67 ± 0.2 | 56.44 | 0.93 ± 0.26 | 39.24 |
| | 2.95 ± 0.22 | 1.24 ± 0.12 | 58.17 | 1.40 ± 0.17 | 52.61 | 1.18 ± 0.17 | 60.14 | 1.90 ± 0.46 | 35.84 | 1.25 ± 0.18 | 57.70 |

Example 19: Inhibitory Effect of β-1,3/1,6-Glucan on AOM/DSS-Induced Inflammation-Associated Colorectal Cancer in Mice Cancer is one of the leading causes of human mortality, and the etiology and pathogenesis of about ¼ of cancer casesrelate to chronic inflammation. Inflammatory bowel disease (IBD) is a kind of intestinal inflammatory diseases with unknown etiology and pathogenesis, which are classified into ulcerative colitis (UC) and Crohn's disease (CD) according to their pathological features, and shows a year-on-year increase and younger trend. Patients with IBD have an increased risk of colorectal cancer (CRC), increased by 0.5%-1% per year after 8-10 years, and after 30 years up to 18% of patients with IBD may develop CRC. Although IBD-associated CRC occupy only 1-2% of all colorectal cancers, it is a common cause of death in patients with IBD. The azoxymethane (AOM)/dextran sodium sulfate (DSS)-induced colitis associated cancer (CAC) animal model has been widely used to study the efficacy and mechanism of new drugs because the model successfully simulates the whole process of IBD-induced CRC, and the elucidation of the pathological changes and carcinogenesis can help identify new candidates of targets for colorectal cancer treatment.

In this example, the mouse colorectal cancer model was established by intraperitoneal injection of AOM and periodic administration of DSS drinking solution, 70 male C57BL/6 mice aged 6-8 weeks were randomly grouped into 7 groups, 10 mice each group, at the beginning. Except the first group is as normal control, the other groups were modeled with AOM/DSS. The mice of the modeled group were given a single intraperitoneal injection of 10 mg/kg of azoymethane (AOM) on the first day of the experiment, and after seven days, the mice were given drinking water containing 1% sodium dextranate (DSS). After seven days, the mice were given 14 days of normal drinking water. 7-day 1% DSS drinking water and 14-day normal drinking water as one cycle, total three cycles were repeated to induce the formation of CAC in the mice.

After the end of the experiment, the mice were dissected, the whole colorectum was taken out, mesentery and attached adipose tissues being carefully removed, the length was measured, and then the whole colorectum was flushed with saline and dissected longitudinally. Macroscopic tumors were counted and measured with vernier calipers under a dissecting microscope. Finally, the effects of β-1,3/1,6-glucan of the present invention were evaluated in terms of colon length, tumor formation rate, and total number of tumors.

The experimental results are shown in below, compared with the blank group, the colon length of the model group is significantly shortened (P<0.01), and the tumor formation rate reached to 77.78%, indicating that the AOM/DSS-induced colorectal cancer model in mice was successful. The tumor formation rate of β-1,3/1,6-glucan (3 mg/kg) group was 16.67%, which was lower compared with the model group, indicating that β-1,3/1,6-glucan (3 mg/kg) has an inhibitory effect on AOM/DSS-induced colorectal cancer in mice.

| groups | Sample size (n) | Colonic length (cm) | Splenic index (%) | Tumor formation rate (%) | Number of tumors |
|---|---|---|---|---|---|
| Blank | 10 | 6.20 ± 0.71 | 0.57 ± 0.08 | 0.00 | 0 |
| model group | 10 | 4.98 ± 0.87 | 2.33 ± 0.83 | 77.78 | 12 |
| Lentinan (2 mg/kg) | 4 | 4.73 ± 0.19 | 1.59 ± 0.08 | 50.00 | 3 |
| B-1,3/1,6-glucan (3 mg/kg) | 12 | 4.62 ± 0.51 | 1.46 ± 0.82 | 16.67 | 5 |

* $p < 0.05$ vs. blank; ** $p < 0.01$ vs. blank; #$p < 0.05$ vs. model; ## $p < 0.01$ vs. model.

Example 20 Characterization of β-1,3/1,6-Glucan Obtained in Preparation Example 1 and Preparation Example 2

The test methods were as follows:
(i) UV full-wavelength scanning spectra: the composition of β-glucan was dissolved and formulated to a concentration of 5 wt %, and a baseline was established with pure water, and the UV full wavelength scan was performed by setting the scan wavelength from 190 to 900 nm with a scan accuracy of 1 nm.
(ii) side chain length was determined using the method of Example 8

Figure 17:
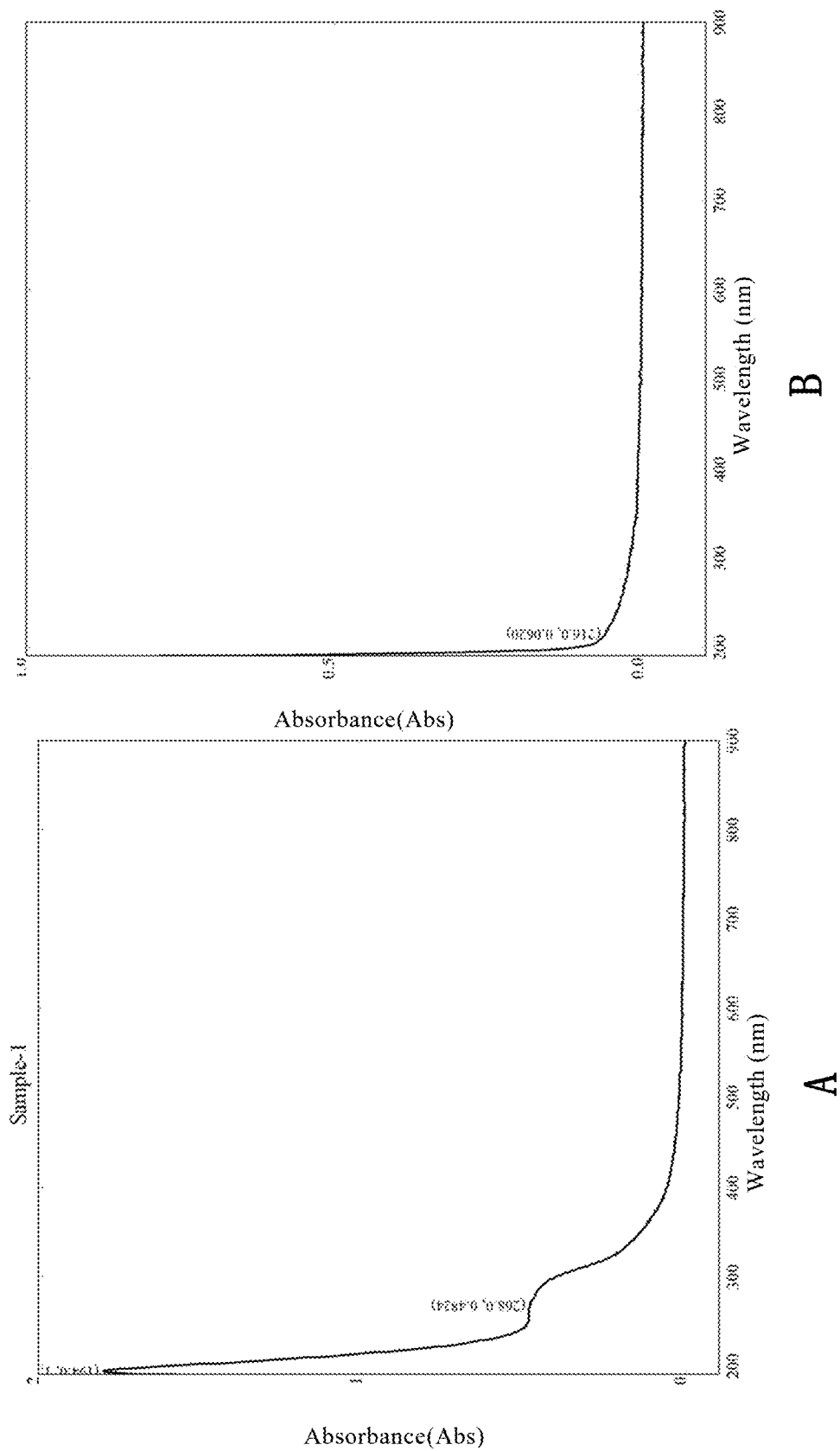
FIGS. 17A and B show the UV full-wavelength scanning spectrum of β-1,3/1,6-glucan prepared according to the method of Preparation Example 1 and Preparation Example 2, respectively.

|  | Preparation Example 1 | Preparation Example 2 |
|---|---|---|
| UV full-wavelength scanning spectra: | Obvious absorption was observed at the wavelength of <230 nm and 260-280 nm. As shown in FIG. 17A | Obvious absorption was observed only at the wavelength of <230 nm. As shown in FIG. 17B |
| Side chain length | Basically of 1to 2 glucose residues | About 5% of the side chains (R) have a length of 3 or 4 glucose residues, the rest ing side chains have a length of 1-2 glucose residues. |

Example 21. Experiment of Tail Vein Injection of β-1,3/1,6-Glucan Against Mouse S-180

Figure 18:
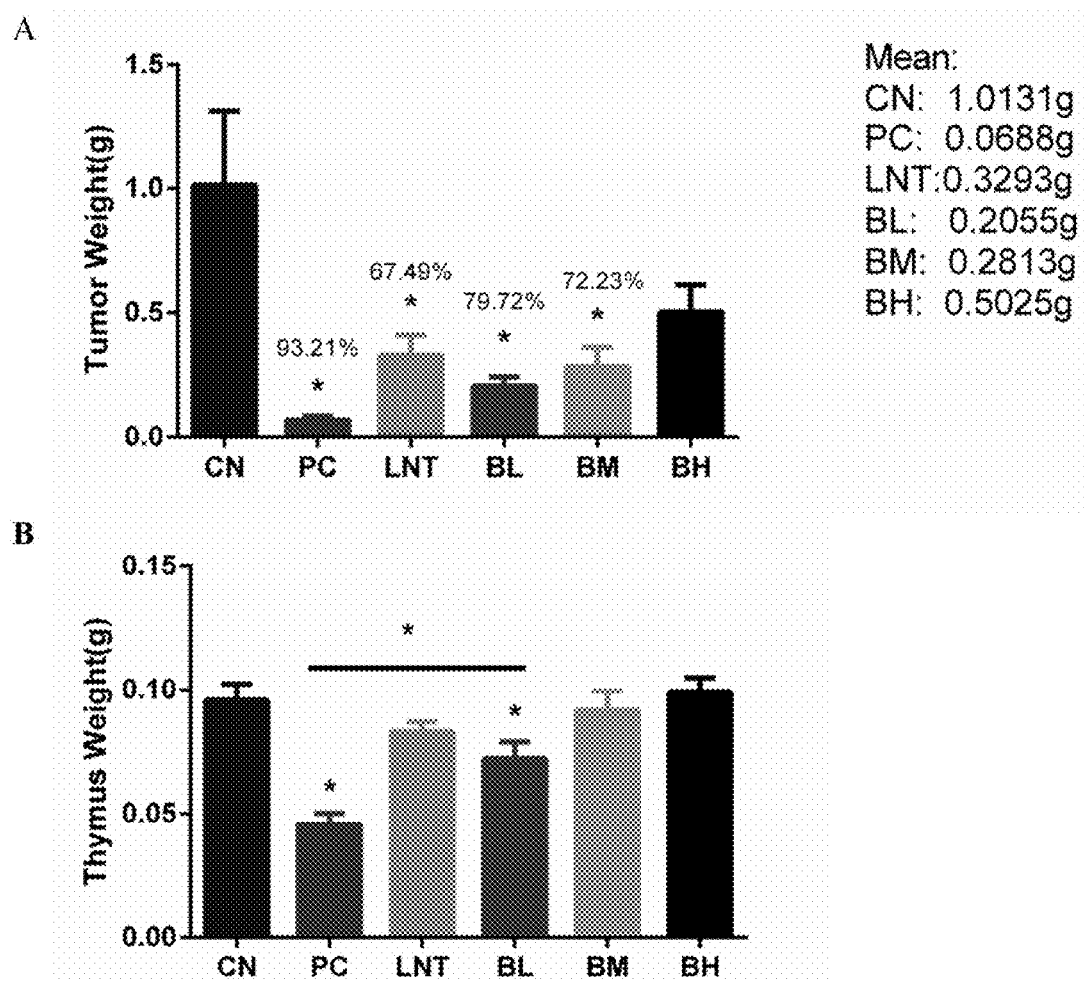
FIGS. 18A and B show the experimental results of Example 21. (A) shows the mean tumor weight and inhibition rate in mice after administration, and (B) shows the gland weight in mice after administration.

Experiments on Immunocompetent Mouse Animal (Administrated Via Tail Vein)
1. Experimental Method:
 Tumor cells: S-180; inoculation site: scapula; mouse species: KM (male); number of mice: 13 for each group; dosing started on the next day after inoculation of tumor cells; dosing frequency: daily dose; dosing cycle: 20 days; administration method: tail vein injection.
 Blank control group: model group (CN group)
 Positive control group: cisplatin (2 mg/kg) (PC or CP group); Lentinan LNT (1.5 mg/kg)
 Experimental group: BL: β-1,3/1,6-glucan low dose (0.3 mg/kg); BM: β-1,3/1,6-glucan medium dose (1.5 mg/kg); BH: β-1,3/1,6-glucan high dose (7.5 mg/kg).
2. Experimental Results
 The results are shown in FIGS. 18A-B. And the mice of the positive control group and experimental group were still in good physiological condition 20 days after inoculation, and the animals were very active and agile before sacrifice.

Compared with the model group, β-1,3/1,6-glucan can significantly inhibit the growth of S-180 tumor at low, medium and high dose, and the inhibition rates are up to 60%-70%. The thymus weight of mice of cisplatin group are significantly lower than that of the model group, the thymus weight of β-1,3/1,6-glucan group (0.3, 1.5, 7.5 mg/kg) are significantly higher than that of the cisplatin group, and the thymus weight of mice of the high-dose BG136 group is comparable to that of the model group. It indicates that β-1,3/1,6-glucan is likely to play a role in anti-tumor by activating the immune system of mice.

Example 22 Antitumor Experiment of Oral Administration of β-1,3/1,6-Glucan

1. Experimental Protocol:
Tumor cells: S-180; inoculation site: axilla; mouse species: Kunming mouse (Kunming); number of mice: 13 for each group (7 females and 6 males); start time of dosing: dosing on the next day after inoculation; dosing frequency: daily; dosing cycle: 10 days; administration method: oral; dosage (mg/kg): ① model (CN); ② cisplatin (CP or PC) 1.5 mg; ③ β-1,3/1,6-glucan: 1 mg (B1); ④ β-1,3/1,6-glucan: 5 mg (B5); ⑤ β-1,3/1,6-glucan: 25 mg (B25); ⑥ cisplatin 1.5 mg+BG 1 mg (CPBI); ⑦ cisplatin 1.5 mg+BG 5 mg (CPB5); ⑧ cisplatin 1.5 mg+BG 25 mg (CPB25).

Figure 19:
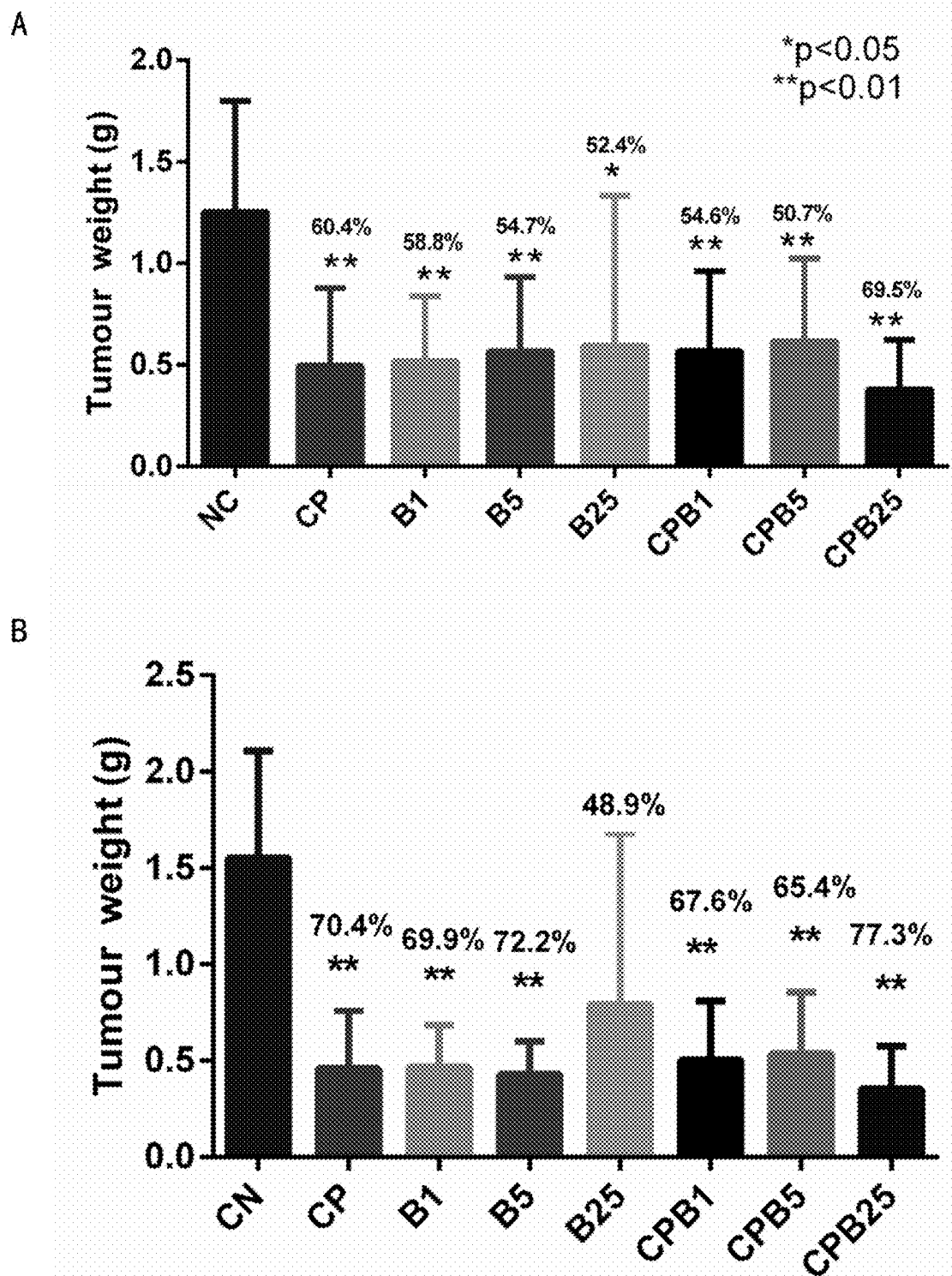
FIGS. 19A and B show the experimental results of Example 22. (A) shows the level of anti-tumor growth effect of β-1,3/1,6-glucan and the combination thereof with cisplatin, and (B) shows the inhibition of tumor weight in male Kunming mice.

2. Experimental Results:
The experimental results are shown in FIGS. 19A and B. From the results of this experiment, it can be seen that oral administration of β-1,3/1,6-glucan has a significant inhibitory effect on S-180 tumors. The overall inhibition rate of β-1,3/1,6-glucan at an oral dose of 1 mg/kg was over 58%, and the tumor inhibition rates in male mice are up to 70.4%. When BG136 (25 mg/kg) is combined with cisplatin (1.5 mg/kg), the inhibition rate is further increased and the tumor inhibition rate reaches 77.3%.

Example 23. β-1,3/1,6-Glucan Combined with Chemotherapy Used in Mouse Tumor Model Effect of β-1,3/1,6-Glucan Combined with Chemotherapy on Leukocytes and Platelets
A cell suspension of $3\times10^5$ mouse melanoma cell line B16 (presented by PerkinElmer) was injected subcutaneously into C57BL/6J mice (female, 6-8 weeks old, purchased from Jinan Pengyue Experimental Animal Company) (Overwijk & Restifo, 2001). About 2 days after tumor implantation, carboplatin (30 mg/kg, twice a week) was injected intraperitoneally and BG136 (4 mg/kg) or Lentinan LNT (2 mg/kg) was injected via tail vein, and tumor volume were measured during administration, and on day 15, after the animal were sacrificed, tumor weight was measured. Blood was taken from the heart after animal were sacrificed, placed in EDTA-anticoagulation tubes. After mixing, 50 μl of whole blood was taken and the immune cell concentration was measured by a hematology analyzer.

The test results showed that the β-1,3/1,6-glucan prepared in Preparation Example 2 enhances the tumor inhibition effect of carboplatin and stimulates the immune response, reverses the immunosuppression after carboplatin administration, as well as the decrease of platelets.

Example 24

Since immune cells play an important role in many types of tumor cells, the antitumor and leukogenic and platelet-raising effects of β-1,3/1,6-glucan may play a role in various tumor cells (e.g., lung cancer, kidney cancer, liver cancer, breast cancer, etc.), and immune cells also play a regulatory role in tumor metastasis and tumorigenesis. Therefore, β-1,3/1,6-glucan may inhibit the metastasis and tumorigenesis of tumor cells.

Example 25. Effect of β-1,3/1,6-Glucan in Combination with PD-1 Antibody on Mouse Tumor Model PD-1 antibody used: name: in vivo MAb anti-mouse PD-1 (CD279); purchased from Bioxcell
(i) Effect of intravenous injection of β-1,3/1,6-glucan combined with PD-1 antibody on mouse subcutaneous transplanted tumors of colon cancer MC38

Figure 20:
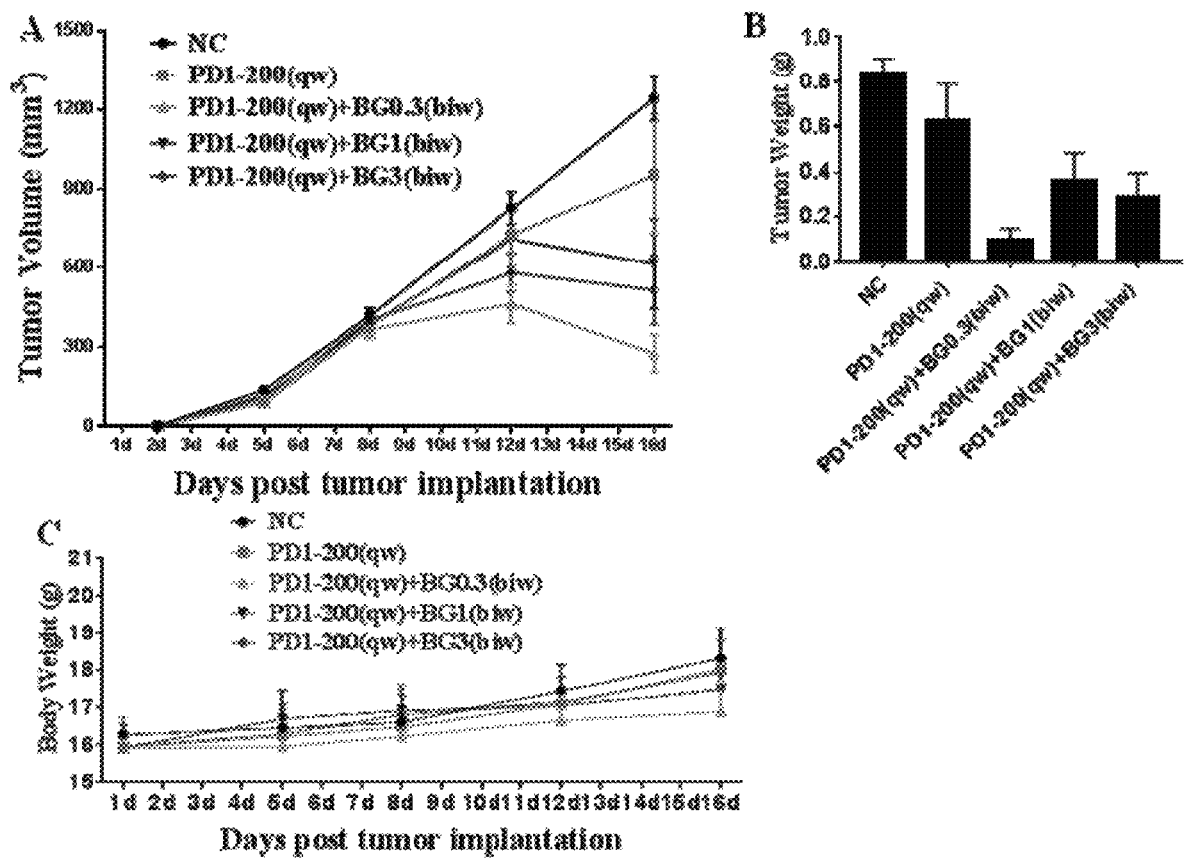
FIGS. 20A-C show that intravenous administration of β-1,3/1,6-glucan in combination with PD-1 antibody effectively inhibits the growth of subcutaneous transplanted tumors of mouse colon cancer MC38 in mice in Example 25(i). In the figures, PD1-200(qw) represents group administered with PD-1 antibody (200 g/mouse) alone, PD1-200 (qw)+BG0.3(biw), PD1-200(qw)+BG1(biw) and PD1-200 (qw)+BG3(biw) represent PD1 antibody (200 g/mouse) combined with β-1,3/1,6-glucan (0.3, 1 or 1 mg/kg) groups, respectively.

In this example, mouse colon cancer cell line MC38 was selected to test the effect of β-1,3/1,6-glucan in combination with PD-1 antibody on the growth of transplanted tumors in mice, and the test results are shown in FIG. 20A-C.

The results in FIGS. 20A and B showed that tail vein injection of β-1,3/1,6-glucan combined with PD-1 antibody can effectively inhibit the growth of MC38 transplanted tumors, with the inhibitory effect being significantly better than the effect in the group administered PD-1 antibody alone, has significant synergism, and no obvious drug toxicity (FIG. 1C) having a good drug safety.

(ii) Effect of intravenous injection of β-1,3/1,6-glucan combined with PD-1 antibody on the expression of tumor immune-related cytokines in mice In this example, the expression of various cytokines in mouse prostate cancer cells MC38 transplanted tumors were quantified by RT-PCR method. The results are shown in FIGS. 21A-F.

Figure 21:
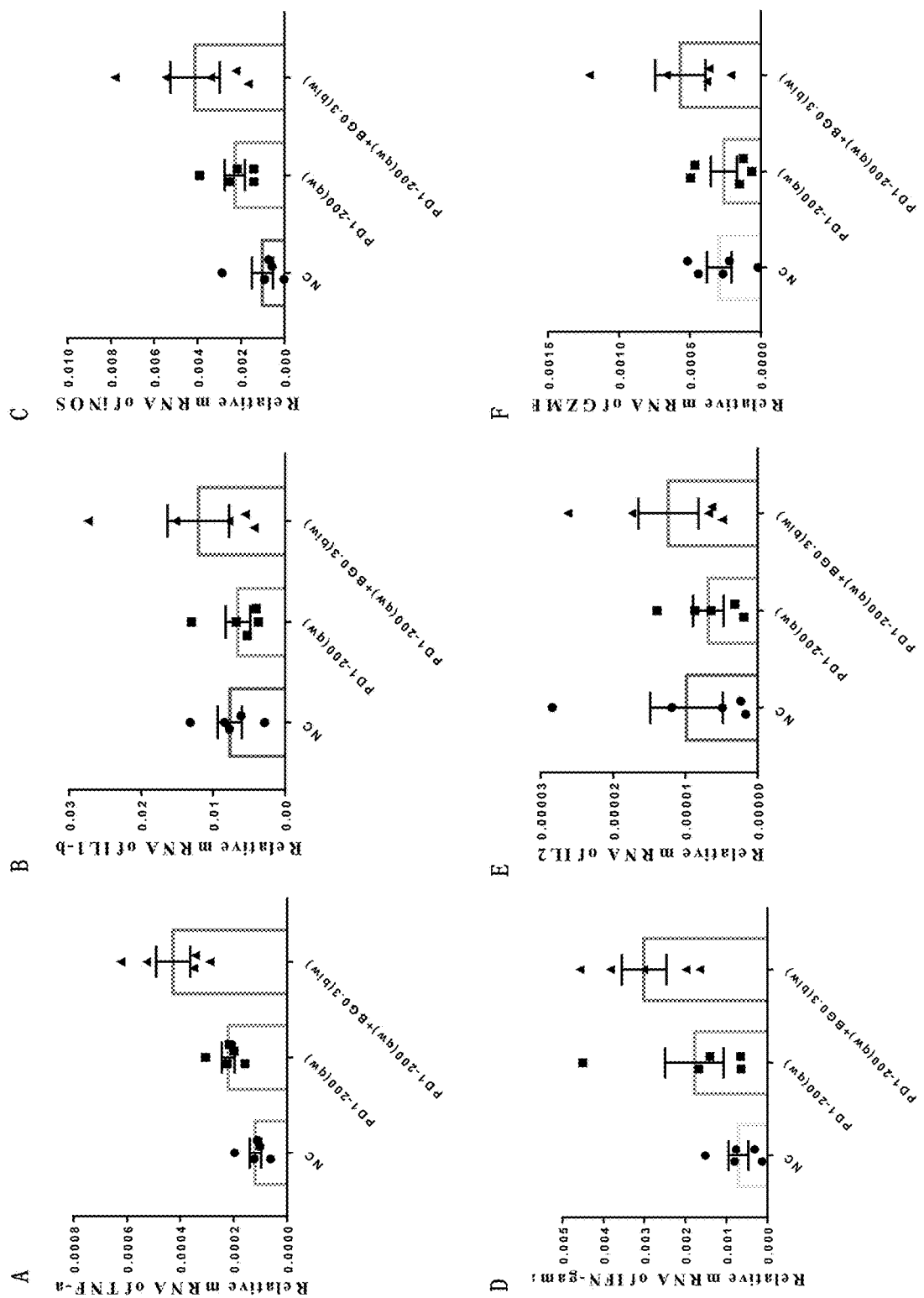
FIGS. 21A-F show the effect of intravenous injection of β-1,3/1,6-glucan combined with PD-1 antibody on the expression of immune-related cytokines of mouse colon cancer MC3 mouse transplant tumors.

It can be seen from the results in FIGS. 21A, B and C, the expression of tumor necrosis factor α (TNFα), interleukin 1β (IL1-β) and nitric oxide synthase (iNOS) produced by macrophages in mouse tumors are significantly increased after the combination of β-1,3/1,6-glucan and PD-1 antibody, indicating that β-1,3/1,6-glucan can synergize with PD-1 antibody together to stimulate intratumoral immune activation.

It can be seen from the results in FIGS. 21D, E and F, the expression of pro-inflammatory Th1 polarizing cytokines (interferon γ, IFN-γ), interleukin 2 (IL-2) and granzyme B (GZMB) are increased after the combination of β-1,3/1,6-glucan and PD-1 antibody, further indicating that β-1,3/1,6-glucan combined with PD-1 antibody can bridge the body's innate immunity and adaptive immunity to exert optimal anti-tumor immunity.

(iii) Effect of oral administration of β-1,3/1,6-glucan combined with PD-1 antibody on mouse tumor model The mouse colon cancer cell line MC38 was selected to detect the effect of β-1,3/1,6-glucan combined with PD-1 antibody on the growth of transplanted tumors in mice. The results are shown in FIGS. 22A-C.

Figure 22:
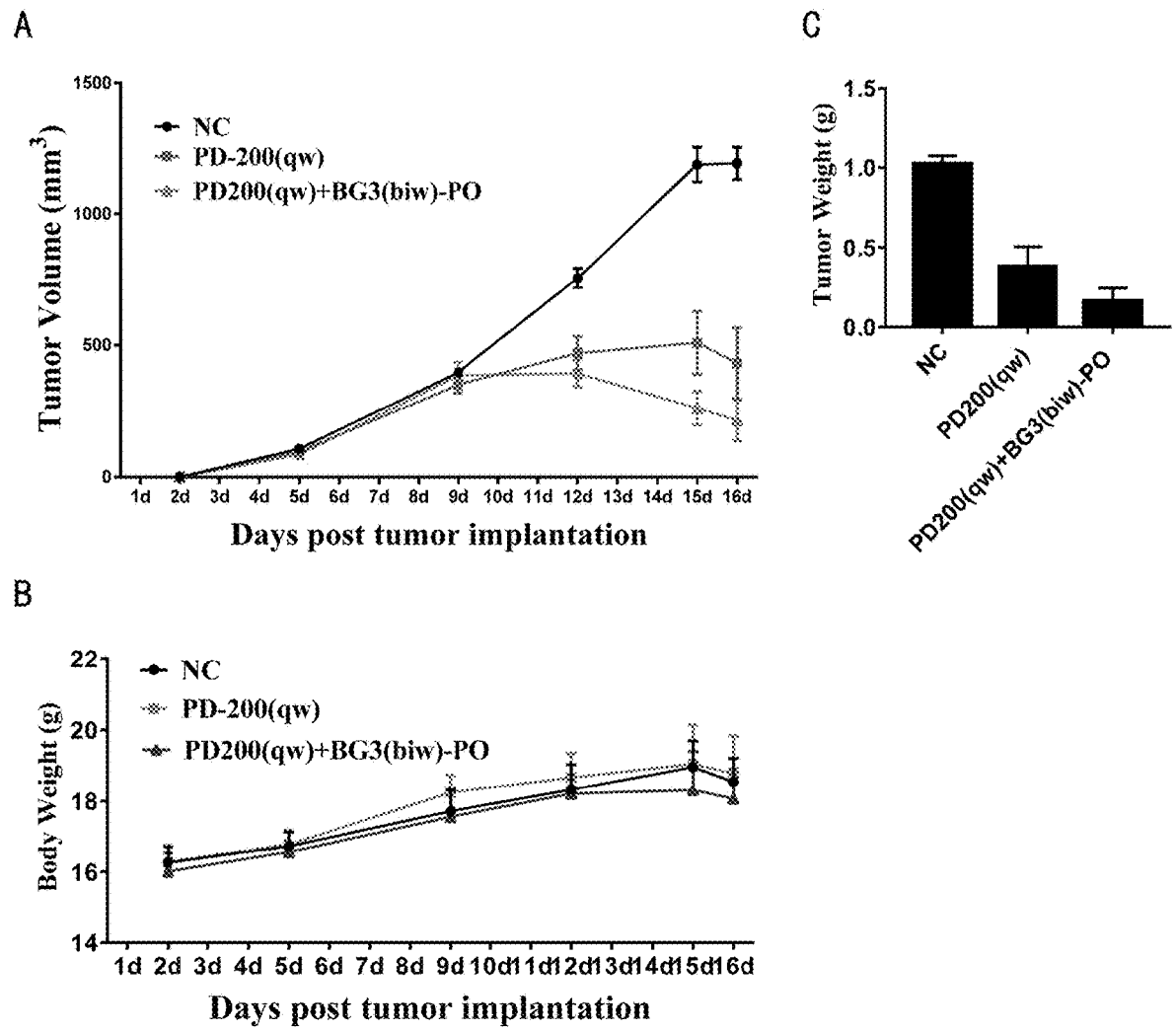
FIGS. 22A-C show the effect of oral administration of β-1,3/1,6-glucan combined with PD-1 antibody on the growth of mouse colon cancer MC38 mouse transplant tumors.

The results in FIGS. 22A and B showed that oral administration of β-1,3/1,6-glucan combined with PD-1 antibody can effectively inhibit the growth of MC38 transplanted tumors with significantly better inhibitory effect than the effect of the group administered with PD-1 antibody alone, has significant synergism, and no obvious drug toxicity (FIG. 22C) having good drug safety.

All documents referred to in the present invention are incorporated by reference herein as if each document is individually incorporated by reference. Further, it should be understood that upon reading the above teaching of the present invention, various modifications or modifications may be made to the present invention by those skilled in the art, and those equivalents also fall within the scope defined by the appended claims of the present application.

The invention claimed is:

1. A composition comprising β-glucan and an immune checkpoint drug, wherein the immune checkpoint drug is a PD-1 antagonist or a PD-L1 antagonist and the β-glucan has a structure of formula (I) or formula (II):

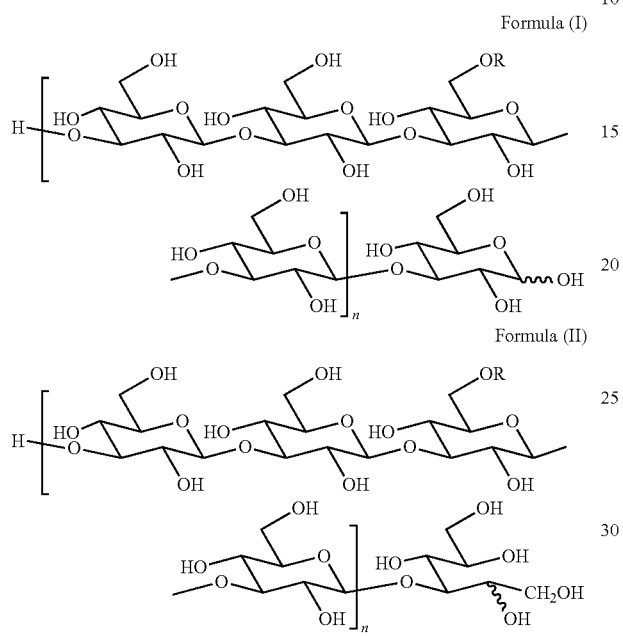

Formula (I)

Formula (II)

wherein n is an integer selected from 1 to 20, each R group is H or 1-4 glucose residues, and when R is not H, 5 to 10% of the R groups have a length of 3 or 4 glucose residues and the remaining R groups have a length of 1 or 2 glucose residues;
in the β-glucan, a content of proteins is 0.01 wt % to 0.5 wt %; and
wherein the β-glucan is prepared by a method comprising the steps of:
(1) degreasing: drying and smashing Antarctic brown algae, then soaking in an organic solvent and stirring to obtain a degreased algal powder;
(2) aqueous extraction: extracting the degreased algae powder by stirring with water at room temperature to obtain an aqueous extract;
(3) grading: centrifuging the aqueous extract obtained from step (2), adding an aqueous solution of a 1~3 mol/L calcium chloride to the supernatant obtained by centrifugation; stirring and then centrifuging, taking the supernatant for dialysis or ultra-filtration desalting, concentrating under reduced pressure and drying to obtain a crude polysaccharide; and
(4) purification: dissolving the crude polysaccharide from step (3) in distilled water, separating and purifying through an anion exchange resin with distilled water and aqueous sodium chloride solution as the mobile phase, collecting the aqueous elution fraction, concentrating under reduced pressure and lyophilizing to obtain the β-glucan;
wherein the separating and purifying through anion exchange resin comprises separating and purifying through a strong anion resin, and then separating and purifying with a weak anion resin; or separating and purifying through a weak anion resin, and then separating and purifying with a strong anion resin.

2. The composition according to claim 1, wherein R in the structure of formula (I) or formula (II) is one or more of the structures of formula (III) or formula (IV) or formula (V) or formula (VI), wherein Glcβ1-;　　　　　　　　　　　　　　　　　Formula (III):

Glcβ1-3Glcβ1- or Glcβ1-6Glcβ1-;　　　　　Formula (IV):

Glcβ1-3Glcβ1-3Glcβ1-, or Glcβ1-6Glcβ1-3Glcβ1-, or Glcβ1-3Glcβ1-6Glcβ1- or Glcβ1-6Glcβ1-6-Glcβ1-;　　　　　　　　　　　　　　　　　Formula (V):

Glcβ1-3Glcβ1-3Glcβ1-3Glcβ1-, or Glcβ1-6Glcβ1-3Glcβ1-3Glcβ1-, or Glcβ1-3Glcβ1-6Glcβ1-3Glcβ1-, or Glcβ1-3Glcβ1-3Glcβ1-6Glcβ1-, or Glcβ1-6Glcβ1-6Glcβ1-3Glcβ1-, or Glcβ1-6-Glcβ1-3-Glcβ1-6Glcβ1-, or Glcβ1-3Glcβ1-6Glcβ1-6Glcβ1-, or Glcβ1-6Glcβ1-6Glcβ1-6Glcβ-.　　　　　　　　　　　　　　　　　Formula (VI):

3. The composition according to claim 1, wherein in the β-glucan, the weight content of five glucose-ten glucose is 0-50.0%, ten glucose-twenty glucose is 0-80.0%, twenty glucose-twenty-five glucose is 0-25.0%, twenty-five glucose-thirty glucose is 0-45.0%, thirty glucose-forty glucose is 0-30.0%, forty glucose-fifty glucose is 0-15.0%, fifty glucose-sixty glucose is 0.1%-55.0%, sixty glucose-seventy glucose is 0.1%-20.0%, seventy glucose-eighty glucoses is 0.1%-15.0%, and greater than eighty glucose is 0-40.0%.

4. The composition according to claim 1, wherein in the β-glucan, the weight content of five glucose-ten glucose is 0-45.0%, ten glucose-twenty glucose is 0-75.0%, twenty glucose-twenty-five glucose is 0-20.0%, twenty-five glucose-thirty glucose is 0-40.0%, the weight content of β-glucan with a degree of polymerization of 30-40 is 0-25.0%, the weight content of forty glucose-fifty glucose is 0-10.0%, fifty glucose-sixty glucose is 0.1%-50.0%, sixty glucose-seventy glucose is 0.1%-15.0%, seventy glucose-eighty glucose is 0.1%-10.0%, and greater than eighty glucose is 0-35.0%.

5. The composition according to claim 1, wherein the β-glucan consists of β-glucans with a degree of polymerization of 20-80, wherein the weight content of twenty glucose-twenty-five glucose is 13.2%-19.8%, twenty-five glucose-thirty glucose is 29.1-43.7%, thirty glucose-forty glucose is 18.2-27.4%, forty glucose-fifty glucose is 7.3-10.9%, fifty glucose-sixty glucose is 4.5%-6.7%, sixty glucose-seventy glucose is 3.5%-5.3%, and seventy glucose-eighty glucose is 4.2%-6.2%.

6. The composition according to claim 1, wherein the β-glucan consists of β-glucans with a degree of polymerization of 20-80, wherein the weight content of the twenty-glucose-twenty-five glucose is 16.5%, the twenty-five glucose-thirty glucose is 36.4%, the thirty glucose-forty glucose is 22.8%, forty glucose-fifty glucose is 9.1%, fifty glucose-sixty glucose is 5.6%, sixty glucose-seventy glucose is 4.4%, and seventy glucose-eighty glucose is 5.2%.

7. The composition according to claim 1, wherein the β-glucan consists of β-glucans with a degree of polymerization of 10-80, wherein the weight content of ten glucose-twenty glucose is 40.6%-60.8%, twenty glucose-twenty-five glucose is 13.4%-20.0%, twenty-five glucose-thirty glucose is 7.7%-11.5%, thirty glucose-forty glucose is 7.6%-11.4%, forty glucose-fifty glucose is 4.2%-6.2%, fifty glucose-sixty glucose is 2.3%-3.5%, sixty glucose-seventy glucose is 1.6%-2.4%, and seventy glucose-eighty glucose is 0.8%-1.2%.

8. The composition according to claim 1, wherein the β-glucan consists of β-glucans with a degree of polymerization of 10-80, wherein the weight content of ten glucose-twenty glucose is 50.7%, twenty glucose-twenty-five glucose is 16.7%, twenty-five glucose-thirty glucose is 9.6%, thirty glucose-forty glucose is 9.5%, forty glucose-fifty glucose is 5.2%, fifty glucose-sixty glucose is 2.9%, sixty glucose-seventy glucose is 2.0%, and seventy glucose-eighty glucose is 1.0%.

9. The composition according to claim 1, wherein the strong anion resin is an anion resin containing quaternary ammonium groups, and the weak anion resin is an anion resin containing diethylaminoethyl groups; and/or
the Antarctic brown algae is selected from the group consisting of Cochayuyo, sea bamboo shoot, and *Durvillaea antarctica*; and/or
the molecular weight of the β-glucan is 1-50 kDa; and/or
the specific rotation of the β-glucan is −16° to −21°, and the UV full wavelength scan spectrum of the β-glucan has no absorption peak within the wavelength range of 260~280 nm.

10. The composition according to claim 1, wherein the immune checkpoint drug is an anti-PD-1 antibody or an anti-PD-L1 antibody.

11. The composition according to claim 10, wherein the anti-PD-1 antibody or anti-PD-L1 antibody is selected from the group consisting of Durvalumab, Atezolizumab, Nivolumab, Spartalizumab, and Camrelizumab.

12. A pharmaceutical composition for injection, wherein the composition comprises:
(1) β-glucan and
(2) pharmaceutically acceptable carriers;
wherein the β-glucan has a structure of formula (I) or formula (II)

(2) aqueous extraction: extracting the degreased algae powder by stirring with water at room temperature to obtain an aqueous extract;
(3) grading: centrifuging the aqueous extract obtained from step (2), adding aqueous solution of a 1~3 mol/L calcium chloride to the supernatant obtained by centrifugation; stirring and then centrifuging, taking the supernatant for dialysis or ultra-filtration desalting, concentrating under reduced pressure and drying to obtain crude polysaccharide;
(4) purification: dissolving the crude polysaccharide from step (3) in distilled water, separating and purifying through anion exchange resin with distilled water and aqueous sodium chloride solution as the mobile phase, collecting the aqueous elution fraction, concentrating under reduced pressure and lyophilizing to obtain the β-glucan;
wherein the separating and purifying through anion exchange resin is:
firstly, separating and purifying through strong anion resin, and then separating and purifying with weak anion resin; or
separating and purifying through weak anion resin, and then separating and purifying with strong anion resin.

13. The pharmaceutical composition according to claim 12, wherein the strong anion resin is an anion resin containing quaternary ammonium groups, and the weak anion resin is an anion resin containing diethylaminoethyl groups.

14. The pharmaceutical composition according to claim 12, wherein the Antarctic brown algae is selected from the group consisting of Cochayuyo, sea bamboo shoot, and *Durvillaea antarctica*.

15. The pharmaceutical composition according to claim 12, wherein the molecular weight of the β-glucan is 1-50 kDa.

16. The pharmaceutical composition according to claim 12, wherein the specific rotation of the β-glucan is −16° to

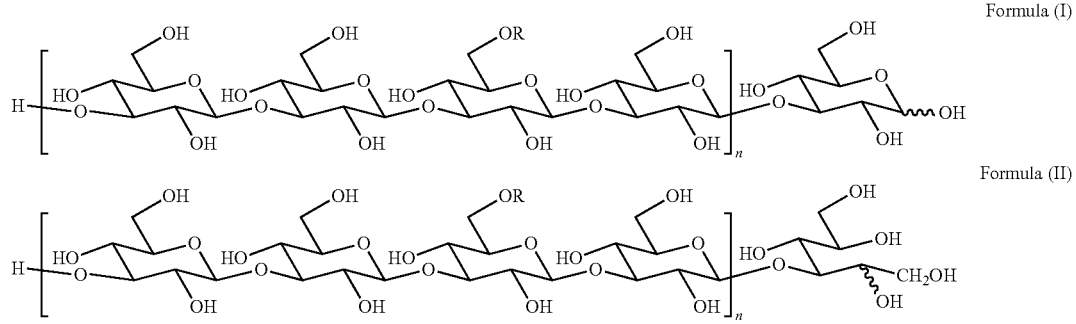

wherein n is an integer selected from 1 to 20, each R is H or 1-4 glucose residues, and when R is not H, 5 to 10% of the R groups have a length of 3 or 4 glucose residues and the remaining R groups have a length of 1 or 2 glucose residues;

in the β-glucan, a content of proteins is 0.01 wt % to 0.5 wt %; and the β-glucan is prepared by a preparing method comprising the steps of:
(1) degreasing: drying and smashing Antarctic brown algae, then soaking in organic solvent and stirring to obtain a degreased algal powder;

−21°, and the UV full wavelength scan spectrum of the β-glucan has no absorption peak within the wavelength range of 260~280 nm.

17. A method for improving or treating tumors and/or tumor-associated inflammatory diseases comprising administering an effective amount of the pharmaceutical composition according to claim 12.

18. The method according to claim 17, wherein the tumor is selected from the group consisting of colorectal cancer, lung cancer, fibrosarcoma, melanoma, kidney cancer, liver cancer, breast cancer, and the combinations thereof.

* * * * *